United States Patent [19]
Oh et al.

[11] Patent Number: 5,723,855
[45] Date of Patent: Mar. 3, 1998

[54] SYSTEM FOR REMOTELY CONTROLLING A MOVABLE OBJECT

[75] Inventors: Ketsu Oh; Shingo Yamaoka, both of Kobe; Kazuhiro Kusuda, Hiratsuka; Kohichi Hayashida, Ebina, all of Japan

[73] Assignee: Konami Co., Ltd., Hyogo-ken, Japan

[21] Appl. No.: 491,797

[22] Filed: Jun. 19, 1995

[30] Foreign Application Priority Data

Jun. 22, 1994 [JP] Japan .................................. 6-140291
Feb. 21, 1995 [JP] Japan .................................. 7-032508

[51] Int. Cl.⁶ .................................................. G01C 21/02
[52] U.S. Cl. ........................ 250/206.1; 250/221; 446/444
[58] Field of Search ............................... 250/208.1, 206.1, 250/221, 222.1; 178/18; 446/444, 454; 463/58

[56] References Cited

U.S. PATENT DOCUMENTS

| | | | |
|---|---|---|---|
| 4,373,293 | 2/1983 | Kakizaki et al. | 446/444 |
| 5,393,970 | 2/1995 | Shau et al. | 250/206.1 |
| 5,572,317 | 11/1996 | Parker et al. | 250/206.1 |

FOREIGN PATENT DOCUMENTS

| | | |
|---|---|---|
| 0213939 | 3/1987 | European Pat. Off. . |
| 0221643 | 5/1987 | European Pat. Off. . |
| 1553067 | 9/1995 | France . |
| 49-113657 | 10/1974 | Japan . |
| 194884 | 4/1989 | Japan . |
| 1112490 | 5/1989 | Japan . |
| 1259404 | 10/1989 | Japan . |
| 3243802 | 10/1991 | Japan . |
| 5107029 | 4/1993 | Japan . |
| 5172531 | 7/1993 | Japan . |
| 2005950 | 4/1979 | United Kingdom . |
| 2216358 | 10/1989 | United Kingdom . |
| 2224613 | 5/1990 | United Kingdom . |
| WO8701216 | 2/1987 | WIPO . |

*Primary Examiner*—Stephone B. Allen
*Attorney, Agent, or Firm*—Jordan and Hamburg

[57] ABSTRACT

A system for remotely controlling a movable object includes a drive controller which is provided on the movable object and controls the driving of the movable object in accordance with movement data; an emitter device which is attached to a movable object movable and emits light; a light sensor which receives light emitted from the emitter device to produce light data; a processor which calculates a position of the emitter device attached to the movable object based on the light data from the light sensor; a movement data generator which generates a movement data for the movable object in accordance with the position calculated by the processor; and a movement data sender which sends the generated movement data to the drive controller provided on the movable object.

20 Claims, 25 Drawing Sheets

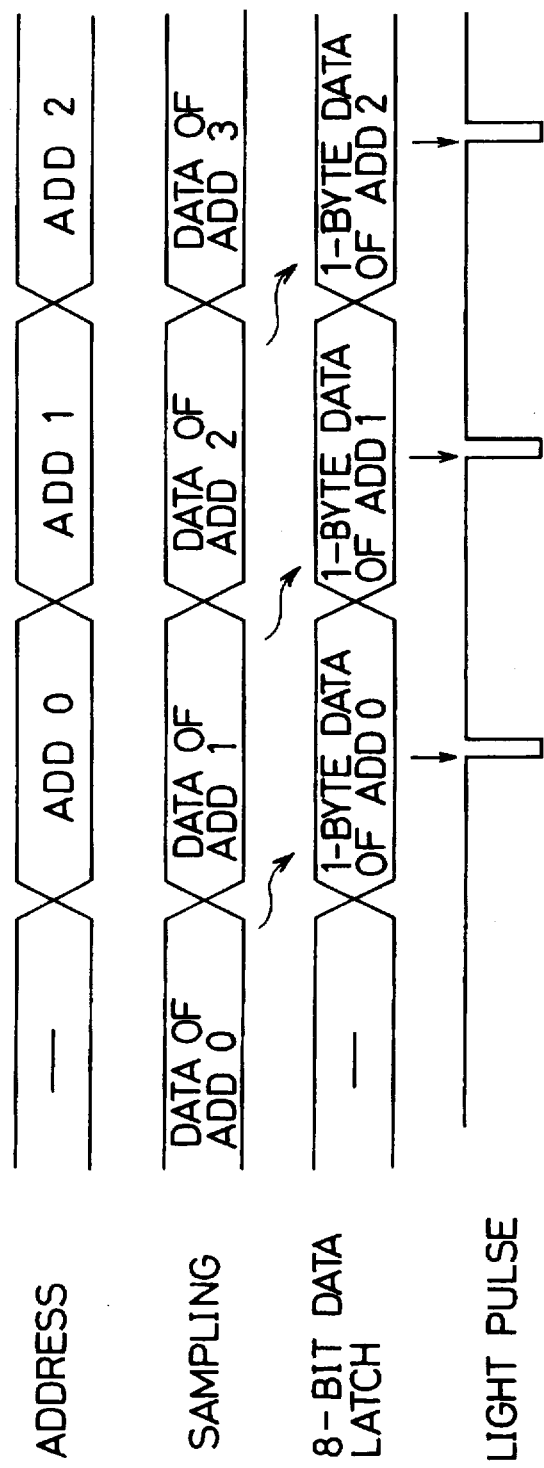

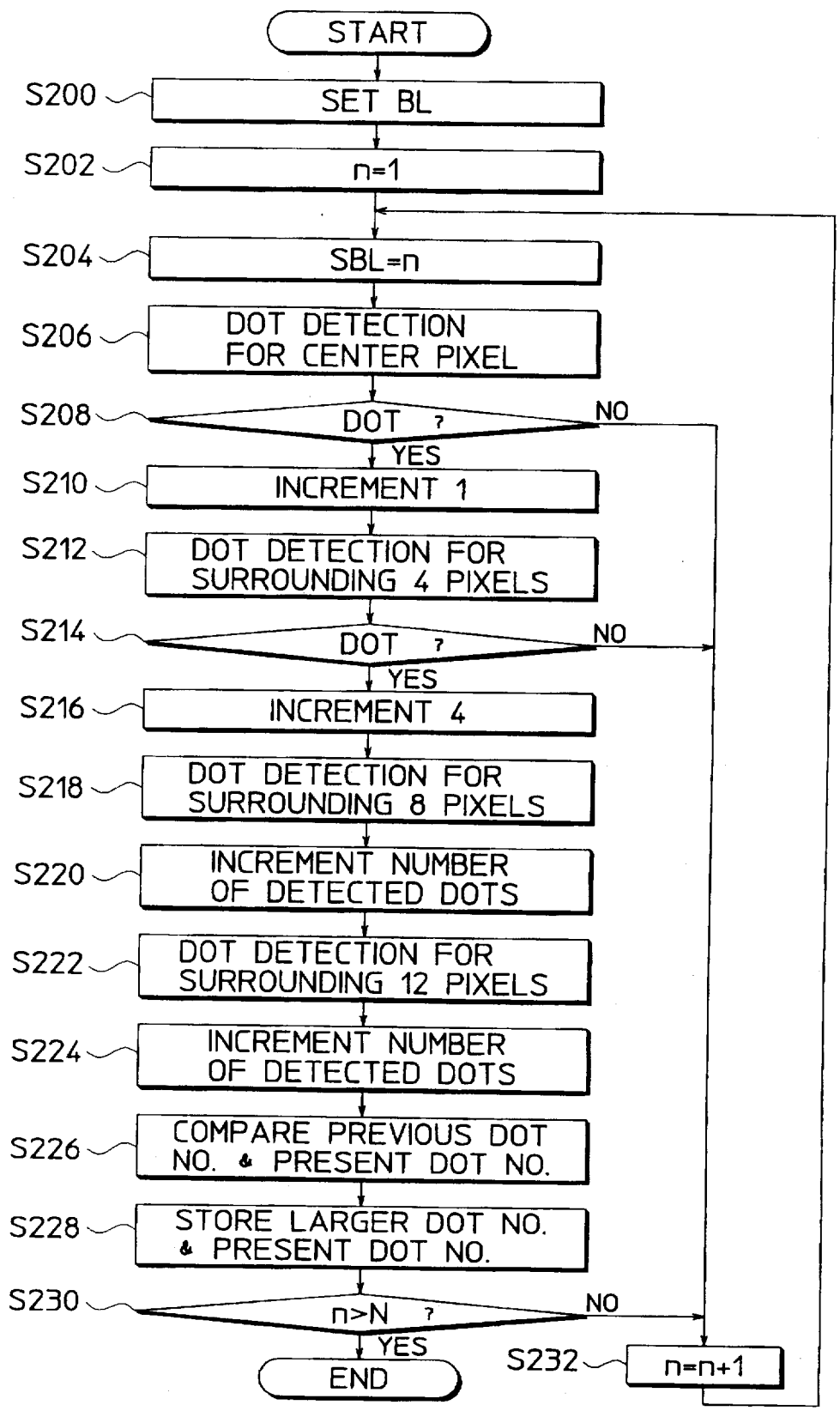

FIG. 24C
| DISTORTED ADDRESS | ACTUAL DATA |
|---|---|
| 0000 | 2010 |
| 0001 | 1912 |
| ...... | ...... |
| 7050 | 6040 |
| ...... | ...... |
| 7080 | 5080 |
| ...... | ...... |
| 70B0 | 60C0 |
| ...... | ...... |
| FFFE | E0EE |
| FFFF | 0FEF |
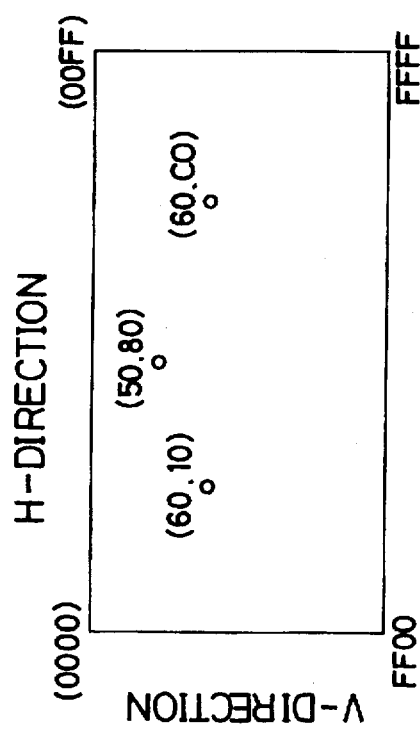
FIG. 24A
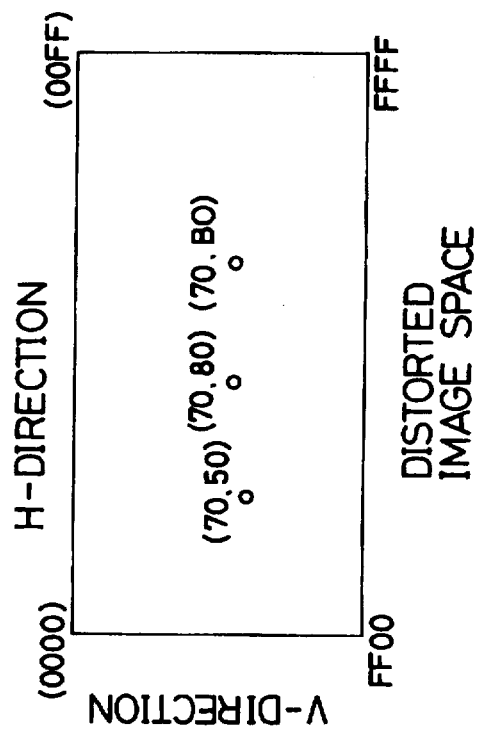
FIG. 24B

SYSTEM FOR REMOTELY CONTROLLING A MOVABLE OBJECT

BACKGROUND OF THE INVENTION

This invention relates to a system for remotely controlling a movement of a movable object which moves within a specified one-, two- or three-dimensional range and, particularly to a system for remotely controlling a movable object by detecting the position of the movable object at a high speed by means of an area sensor such as a CCD.

Recently, there have been known so-called free track type racing game machines in which running bodies run while freely changing their tracks by itself, instead of the prior art racing game machines in which running bodies run along predetermined tracks. There have been, for example, proposed double-decker free track type game machines, in which running bodies which run between a track plate and a base having such a construction as to enable the position detection while having their positions detected, carry racing cars or horses which are moved on the track plate while being attached by magnets, etc. to the corresponding running bodies with the track plate between them (Japanese Unexamined Patent Publications Nos. 1-94884 and 1-259404).

There have also been handling toys which monitor from above a movable object provided with a emitter device which blinks at a high speed by means of a frame-scannable optical sensor, receive and identify an optical signal from the emitter device based on a combination of received images from the emitter device which are detected in a specified number of frames (Japanese Unexamined Patent Publication No. 1-112490).

The double-decker type game machines have the possibility that racing cars or the like running on the track plate are detached from the running bodies because of the inertial force acting at curves, the spinning, or the contact with the other racing cars. In such a case, the racing cars cannot run any further. Thus, there was a limit in realizing a free running on the track surface which resembes the real races. Further, movable bodies capable of moving in a three-dimensional manner cannot be applied to these double-decker type game machines. Furthermore, because of the complicated construction of the base for detecting the positions of the running bodies, it is difficult and expensive to manufacture such a game machine and change the size of the base. In addition, because of the mechanical or electrical contacts between the running bodies and the base, it is difficult to improve the reliability of the game machine and is cumbersome to conduct a maintenance.

Further, in the handling toys for monitoring from above the movable bodies by means of the frame-scannable optical sensors, a specified number of frames of images have to be used to detect the position of the movable bodies. Accordingly, the positions of the movable bodies cannot be detected at a high speed, making it very difficult to control the running of a plurality of movable bodies while making it look real. As a result, the movements of the movable members was limited to the simple ones. Particularly, the above position detection is not suitable for the free track type racking game machines which require a high-speed running, i.e., high-speed position detection and a control executed based on the detected positions. This can be said also for the following reasons: a plurality of frames are required to confirm the positions of the movable bodies, and it is very difficult to guarantee an accurate synchronization because the movable bodies cannot be recognized unless the imaging timing for the plurality of frames is synchronized with the timing at which the state of the emitter device is changed.

SUMMARY OF THE INVENTION

It is an object of the present invention to provide a system for remotely controlling a movable object which has overcome the problems residing in the prior art.

It is another object of the present invention to provide a system for remotely controlling a movable object which makes it possible to detect a position of a movable body at a high speed and execute a high-speed movement control to a multitude of movable bodies.

The present invention is directed to a system for remotely controlling a movable object comprising: a drive controller which is provided on the movable object and controls the driving of the movable object in accordance with movement data; an emitter device which is attached to a movable object and emits light; a light sensor which receives light emitted from the emitter device to produce light data; a processor which calculates a position of the emitter device attached to the movable object based on the light data from the light sensor; a movement data generator which generates the movement data for the movable object in accordance with the position calculated by the processor; and a movement data sender which sends the generated movement data to the drive controller provided on the movable object.

The emitter device may include a light emitting element.

It may be appreciated to further provide an emitter controller which controls the emitter device attached to the movable object to emit light at a specified time. Also, the emitter controller may cause the emitter device to emit light when the movable object is at a predetermined position for the movable object. The processor may further identify the movable object based on the light emission at the predetermined position. Further, it may be appreciated that the emitter device is constructed by a first emitter and a second emitter attached to the movable object; and the emitter controller causes the first and second emitters to emit light at different times when the movable object is at a predetermined position for the movable object; and the processor detects a running direction of the movable object based on the respective light emissions of the first and second emitters at the predetermined position.

The processor may be constructed by a memory which stores light data from the light sensor and has a storage area; a designator which designates a portion of the storage area of the memory; a reader which reads light data within the designated portion of the memory; and a calculator which calculates a position of the movable object based on the read light data.

The light sensor may be an area sensor provided with photoelectric conversion elements arranged in a matrix. The calculator may be constructed by a counting portion which counts the number of photoelectric conversion elements which have received light from the emitter device based on the light data read by the reader; a coordinate value accumulating portion which accumulates coordinate values of the photoelectric conversion elements counted by the counter in the memory; and a calculating portion which calculates a position of the emitter device based on the counted number and the accumulated coordinate values.

It may be appreciated that the designator designates a next portion based on a currently calculated position of the emitter device. The designator may include a moved amount calculating portion which calculates a moved amount of the emitter device based on the calculated position of the emitter device; and a designating portion which designates a next portion based on a currently calculated position of the emitter device and the calculated moved amount.

The light sensor may be provided with a lens for focusing a light image on a surface of the light sensor. The processor may be provided with a corrector which corrects the calculated position of the emitter device by a possible distortion of the lens.

It may be preferable that the emitter device is operable to emit light lying outside a frequency band for visible radiations; and the light sensor is operable to receive only light lying in the same frequency band of light emitted by the emitter device.

With these remote controlling systems, light emitted from the emitter device carried by a movable object is received by the light sensor, and a position of the movable object is calculated based on light data. When a target position, a moving direction and a speed of the movable object are preset, the movement data is generated based on the calculated position together with the set contents, and is sent from the movement data sender to the drive controller. Upon receipt of the movement data, the movable object moves according to the instructed contents within the specified moving range.

The emitter controller causes the emitter device carried by the movable object to emit light when the movable object is at a predetermined position to enable the processor to identify the movable object. Also, since the emitter controller causes the first and second emitter attached to the movable object to emit light at different times to enable the processor to detect a running direction of the movable object.

The light data is transferred to the memory. Light data within a designated portion of the memory is read by reader and is then used to calculate a position of the movable object. This will assure a higher speed position calculation.

The counting portion of the calculator counts the number of photoelectric conversion elements which have received light from the emitter device based on the contents stored in the designated portion of the memory. On the other hand, the coordinate value accumulating portion accumulates coordinate values of the photoelectric conversion elements counted by the counting portion. A position of the emitter device is calculated based on the obtained count value and the accumulated coordinate value, which will consequently provide more accurate position at a higher speed.

A next portion is set on the basis of the moved amount of the emitter device calculated based on the currently calculated position of the emitter device and the moved amount of the emitter device. There is provided the corrector which corrects the calculation result of the processor which involves a distortion of the lens. Accordingly, more accurate position of the emitter device can be obtained.

The emitter device is allowed to emit light lying outside the band for the visible radiations, and the light sensor receives only the light lying the same frequency band of the light emitted by the emitter device. This will increase the preciseness of position calculation.

These and other objects, features and advantages of the present invention will become more apparent upon a reading of the following detailed description and accompanying drawings.

BRIEF DESCRIPTION OF THE DRAWINGS

FIG. 6 is a timing chart showing an operation of the circuit shown in FIG. 5;

FIG. 20B showing a sub-trace block SBL. FIG. 20C exemplarily showing how dots are detected, FIG. 20D showing a method for scanning the sub-trace block SBL in the trace block BL;

FIG. 21 is a flowchart showing dot detection in the sub-trace block SBL;

FIG. 23A showing an actual image space, FIG. 23B showing a virtual image space, and FIG. 23C being a graph showing the relationship between a distance from a principle point and the distortion;

FIGS. 24A, 24B and 24C show the position correction on a measuring surface, FIG. 24A showing an actual image space, FIG. 24B showing a virtual image space, and FIG. 24C being a conversion table for correction data.

DETAILED DESCRIPTION OF THE PREFERRED EMBODIMENTS OF THE INVENTION

Figure 1:
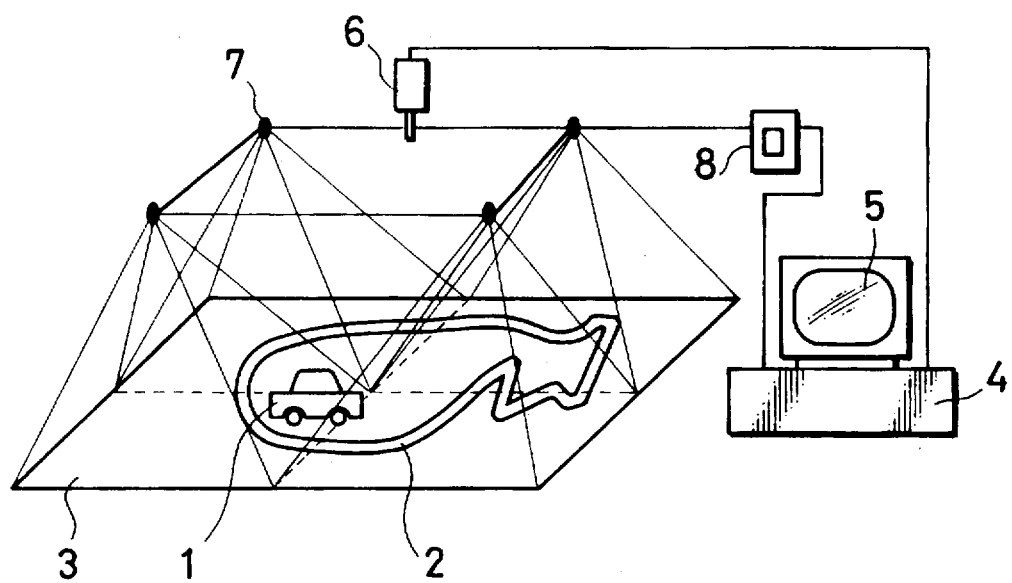
FIG. 1 is a perspective view showing an overall construction of a game machine embodying the present invention.
Figure 2:
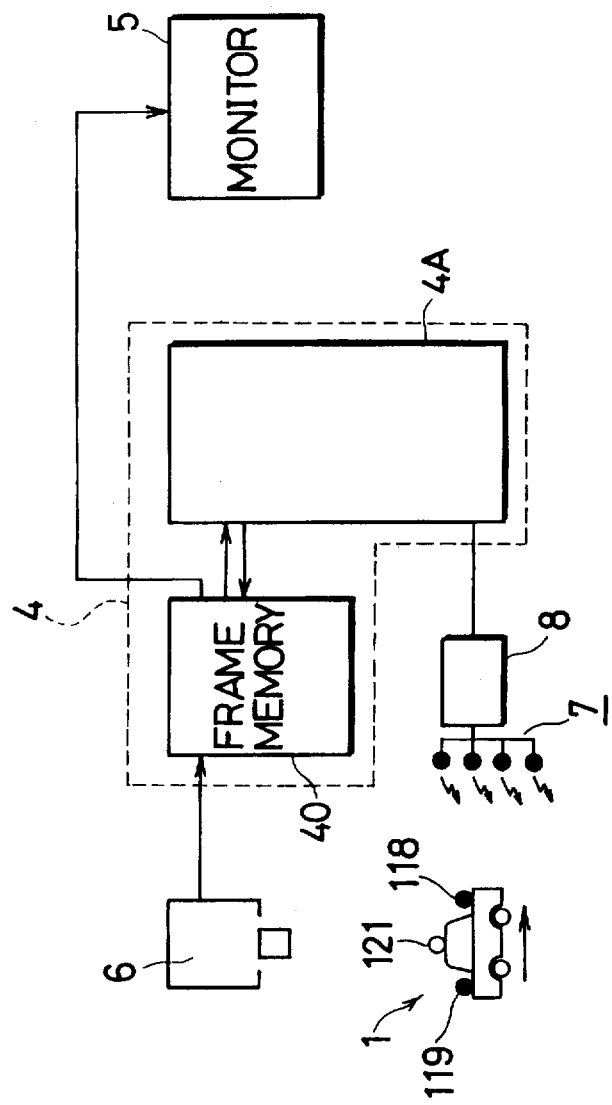
FIG. 2 is a block diagram of the game machine shown in FIG. 1.

FIGS. 1 and 2 are a perspective view and a block diagram showing an overall construction of a game machine incorporating an inventive system for remotely controlling a movable object. This game machine includes a car 1 as a movable object and a machine main body. The car 1 has wheels at front and rear sides thereof, and runs on a circuit simulating base 3 on which a race track 2 is drawn. The machine main body includes a controller 4, a monitor 5, a CCD camera 6 as an area sensor, transmission LEDs 7 as data transmitter, and a transmission unit 8 provided between the controller 4 and the LEDs 7.

The controller 4 centrally controls the overall operation of this game machine, and is provided internally with a computer (microcomputer) 41 (see FIG. 4), a frame memory 40, electrical circuits as a hardware for detecting the car 1 (referred as 4A in FIG. 2), a ROM in which a game program, a course data, and a race development data stored in advance, and a RAM for reading an image in the frame memory 40 during the initialization, temporarily storing the data being calculated, and storing necessary parameters. The controller 4 is also provided with a specified counter. The microcomputer 41 calculates the position, speed and running direction of the car 1 based on the detection result as described later. The construction of the controller 4 is described later in more detail with reference to FIG. 4.

The course data is such that the position data representing a desired running course on the race track 2 drawn on the base 3 are successively stored at specified periods in the form of H-coordinates and V-coordinates. When there are a plurality of cars 1, the position data corresponding to the respective cars 1 are provided. The data concerning the race development decides the ranking. There are a plurality of kinds of race developments. After the start of each race, the race development is decided by means of a random generator, etc. Alternatively, in one race development, the position data may be randomly given to the different cars 1 after the start of each race. The controller 4 grasps the race development set for the cars 1, and gives the respective cars 1 running control signals in conformity with the set race development.

The monitor 5 is not particularly needed during the game, but is adapted to display the detection state of the car 1 during the manufacturing and the maintenance. Though unillustrated, this game machine is provided with a known construction which is generally required for a medal game. This construction includes a device for calculating and displaying odds, a medal slot, a medal detector, a device for allowing game participants to input their predicted rankings, a device for detecting the input rankings, a device for judging whether each car received a prize, a device for calculating the number of medals to be converted and its converting device, etc.

In the case of one CCD camera 6, it is disposed in a position a specified distance above the substantially center of the base 3 with its image sensing surface faced downward so that the upper surface of the base 3 can be entirely covered by a view of the CCD camera 6. Accordingly, in consideration of a view frame of the CCD camera 6, the shape of the base 3 is preferably square or circular. However, the base 3 can take a variety of shapes other than the above shapes depending upon the shape of the race track and the kinds of the game. As well-known, the CCD camera 6 includes a multitude of photoelectric conversion elements as solid state image pick-up devices arranged in a matrix. The CCD camera 6 picks up an image at a selective specified period. e.g., either in a scanning cycle of 1/60 second (one field) or in a scanning cycle of 1/30 second (one frame). Electrical signals converted to have level corresponding to amounts of light received by the respective photoelectric conversion elements are output from the CCD camera 6. The CCD camera 6 used in this embodiment has an infrared transmitter filter disposed on its light receiving surface, so that it receives only the infrared radiations in a specified frequency band. This prevents an erroneous operation caused by external light. A plurality of CCD cameras may be used instead of the single CCD camera 6. In this case, the upper surface of the base 3 may be divided into a plurality of areas and the respective CCD cameras may pick up images in their corresponding areas. In this way, the resolution of the picked up images, i.e., the position detection accuracy can be improved.

The transmission LEDs 7 are light emitting devices for emitting, for example, infrared radiations. Similar to the CCD camera 6, the LEDs 7 are disposed at specified height from the base 3 with the light emitting portions faced downward. The infrared signals from the LEDs 7 are directed at the car 1 running on the race track 2 and propagates while spreading at a specified angle. Only one transmission LED 7 may be disposed in the center position. In order to make the signal transmission reliable, two LEDs may be disposed to cover the respective areas defined by dividing the surface of the base 3 into two parts. In this embodiment, four LEDs are disposed to cover the respective areas defined by dividing the surface of the base 3 into four parts. With a plurality of LEDs 7, the transmission unit 8 transmits a synchronized optical pulse signal to the respective LEDs 7 connected in parallel therewith. Thus, even if the areas covered by the respective LEDs 7 partially overlap, no interference occurs, with the result that the occurrence of the erroneous operation can be prevented. In place of the connecting method shown in FIG. 2, the LEDs 7 may be serially connected, which is simple in its construction, or may be serially connected via drivers (using shield wires) so as to suppress the influence of impedance and to prevent the noise generation. The connecting method shown in FIG. 2 is advantageous as compared with the serial connection in that the influence of impedance is smaller.

Figure 3:
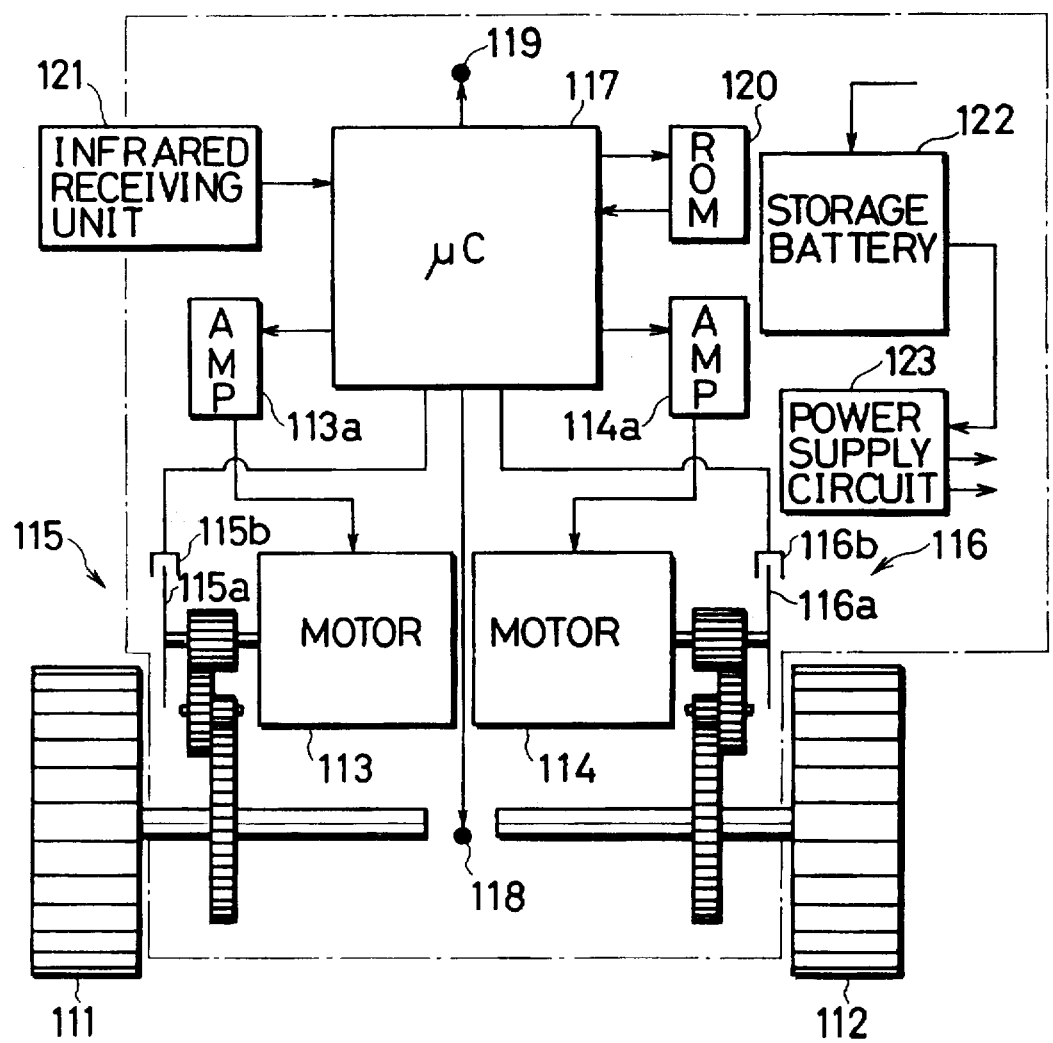
FIG. 3 is a block diagram showing a horizontal arrangement of main parts of a car.

FIG. 3 is a block diagram planarly showing the construction of the car 1.

The car 1 has an unillustrated body, which has a so-called three-point support structure. In other words, wheels 111, 112 are rotatably mounted at the opposite lateral sides of the front side of the car body, and an unillustrated ball (ball caster) is disposed in the center of the rear (or front) side of the car body. This ball is fitted in a partially spherical hole which is formed on the bottom surface of the car body so as to volumetrically accommodate at least the half of the ball. The ball is rollable by 360 degrees. By adopting the three-point support structure, the slip of the ear body can be effectively simulated. In place of the ball, rotatable wheels may be mounted at the opposite lateral sides.

The car 1 includes motors 113 and 114 for driving the wheels 111 and 112 formed of resin or like material, respectively. DC motors are used as the motors 113 and 114. The speed of the car 1 is duty-controlled and, if necessary, the car 1 is caused to run backward (by inverting the polarity of a supply current). Alternatively, pulse motors capable of controlling the speed using a pulse frequency may be used. A plurality of reduction gears are mounted between rotatable shafts of the motors 113 and 114 and those of the wheels 111 and 112 so that a specified speed range is obtainable. Further, rotating speed detectors 115 and 116 for detecting the rotating speed of the motors 113 and 114, respectively, are provided so as to feedback-control the speed of the car 1. The detectors 115, 116 include rotating plates 115a, 116a formed with perforations at specified intervals in their circumferential direction and which are rotatably mounted on the rotatable shafts of the motors 113 and 114, and photointerrupters 115b, 116b disposed to hold the rotating plates 115a, 116a therebetween to detect the perforations formed in the plates 115a, 116a, respectively.

Indicated at 117 is a one-chip microcomputer as a controller for the car 1. The microcomputer 117 analyzes the signals transmitted from the LEDs 7 of the machine main body to generate a running control signal for the car 1, and causes front and rear LEDs 118 and 119 to emit infrared radiations. Its operation program is stored in a ROM 120. Indicated at 113a and 114a are amplifiers for amplifying the speed control signals output from the microcomputer 117 and sending the amplified signals to the motors 113 and 114, respectively.

As shown in FIG. 2, the front LED 118 is disposed in the center of the front part of the car 1, whereas the rear LED 119 is disposed in the center of the rear part of the car 1. These LEDs 118 and 119 face straight above. The frequency band of the infrared radiations emitted from the LEDs 118 and 119 coincides with the transmission frequency band of the infrared transmitter filter disposed on the front surface of the CCD camera 6. The LEDs 118 and 119 are constructed such that the light emitted therefrom propagate while spreading at a wide angle. Thus, the image of the car 1 in any arbitrary position on the base 3 can be picked up by the CCD camera 6.

Referring back to FIG. 3, indicated at 121 is an infrared receiving unit which includes a photodiode or like device for receiving the optical pulse signals transmitted from the LEDs 7. As shown in FIG. 2, the unit 121 is disposed, for example, in the middle of the top of the car 1 with faced upward. This photodiode is, for example, exposed so that it can receive the light from the wide range of directions. Indicated at 122 is a storage battery including a Ni—Cd battery capable of storing and releasing charges. This storage battery 122 is used as a battery for the car 1. Indicated at 123 is a stabilizing power supply circuit for generating, from a voltage from the storage battery 122, a voltage of 5V necessary to operate the microcomputer 119 and a voltage of 6V necessary to operate the motors 113 and 114.

Figure 4:
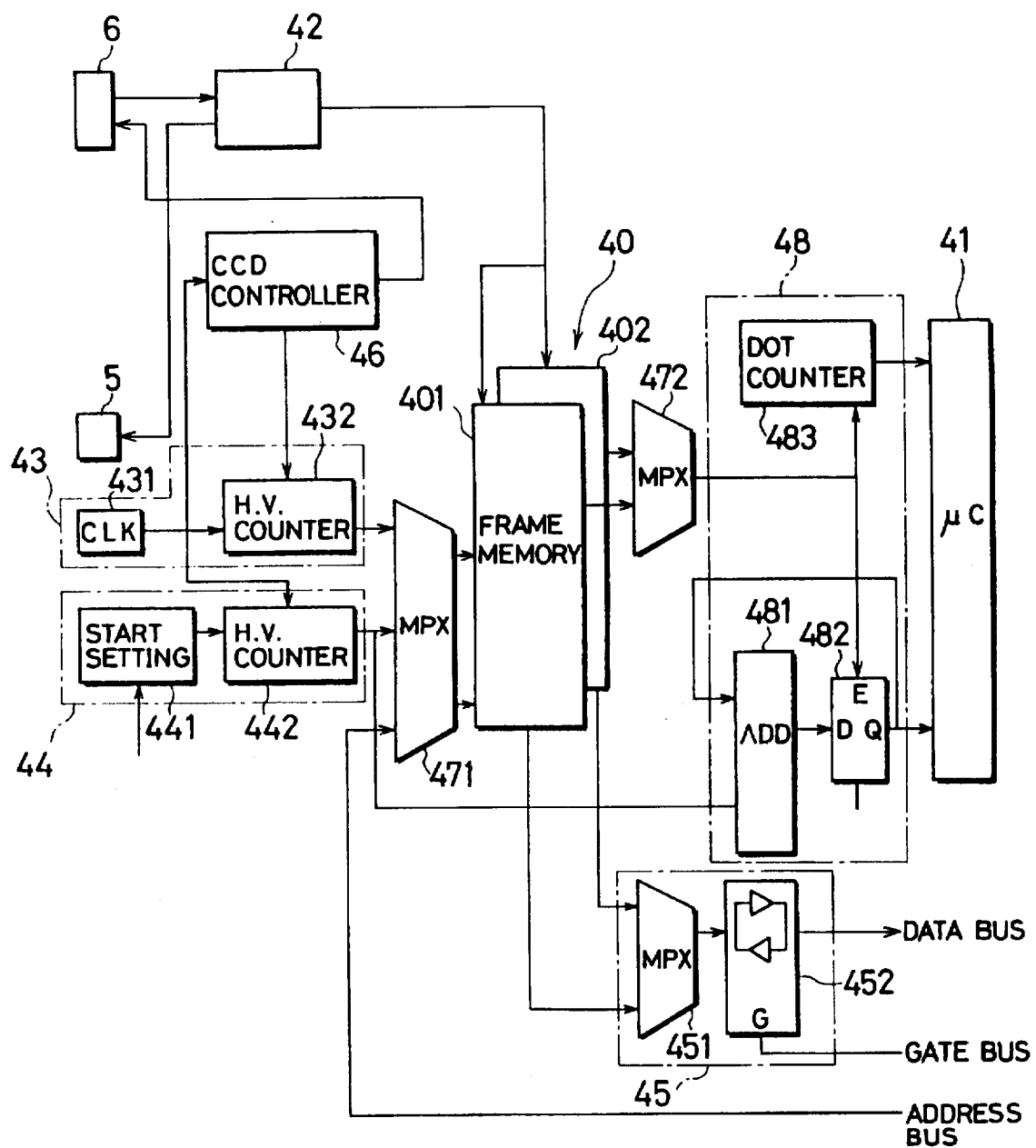
FIG. 4 is a block diagram of a portion of a controller for detecting the position of the car.

FIG. 4 is a block diagram of the portion of the controller 4 where the position of the car 1 is detected.

A binary processing circuit 42 converts an image on the base 3 which is picked up by the CCD camera 6 into a binary data of high and low, and transfers the converted data to the frame memory unit 40. The binary processing circuit 42 is described in detail later with reference to FIG. 5. The frame memory unit 40 includes frame memories 401 and 402 having a storage capacity coinciding with or corresponding to the number of the pixels of the CCD camera 6. The frame memories 401 and 402 are alternately switched in specified cycles to store the image data. This cycle is selected either the field cycle (½ of the frame cycle) or the frame cycle.

Indicated at 43 is a write address generator for generating a write address of the frame memory unit 40. The address generator 43 includes, for example, a reference clock generator 431 for outputting a reference clock pulse of 14 Mhz and a H-, V-counter 432 for generating H-, V-addresses. The counter 432 outputs a write address for scanning all the addresses of the frame memory unit 40 at a speed synchronized with the field cycle. The counter 432 is adapted to write the binary data from the binary processing circuit 42 alternately in the frame memories 401 and 402.

Indicated at 44 is a read address generator for generating a read address for a specified area (hereinafter, referred to as a trace block) in the frame memory unit 40. The read address generator 44 includes a start setting circuit 441 for setting a starting position of the trace block, and a H-, V-counter 442. The generator 44 operates after an initial position recognition to be described later, and generates a read address of the trace block based on a start address (Hs, Vs) of the trace block and a trace block size data supplied from the microcomputer 41. In this way, the binary data only within the trace block are read.

Indicated at 45 is a data reading circuit for reading the binary data read in correspondence with the read address of the frame memory unit 40 output from the microcomputer 41 at the time of the initial position recognition, and outputting the read data to the microcomputer 41. The data reading circuit 45 includes a multiplexer 451 and a buffer 452. In the initial position recognition, there is a possibility that the data from the front and rear LEDs 118 and 119 may contain noises. The entire binary data in the frame memory unit 40 are processed by the microcomputer 41. The reading circuit 45 is provided to this end. More specifically, when a PC address is sent from the microcomputer 41, the binary data in the designated addresses are read one after another via the multiplexer 451, and are introduced to the microcomputer 41 via the buffer 452. The buffer 452 is adapted to output a parallel data of, e.g., 8 bits to the PC-address.

A CCD camera controller 46 generates a synchronization signal and a camera synchronization signal in accordance with the reference clock from the reference clock generator 431. In accordance with these synchronization signals, the frame memories 401 and 402 are switched, and the cycle and timing of the scanning by the CCD camera 6 are synchronized with the generation of the addresses of the frame memory.

Indicated at 471, 472 are multiplexer as switching circuits. The multiplexer 471 suitably switches the addresses from the counters 432, 442 and the PC-address from the microcomputer 41 and sends it to the frame memory unit 40. The multiplexer 472 switches outputs from the frame memories 401 and 402. Indicated at 48 is a data accumulating circuit which includes an adding circuit 481, a latch circuit 482, a dot counter 483. The accumulation result is sent to the microcomputer 41, which in turn calculates the position of the car 1, the trace block and the running control data based on the received accumulation result.

Figure 5:
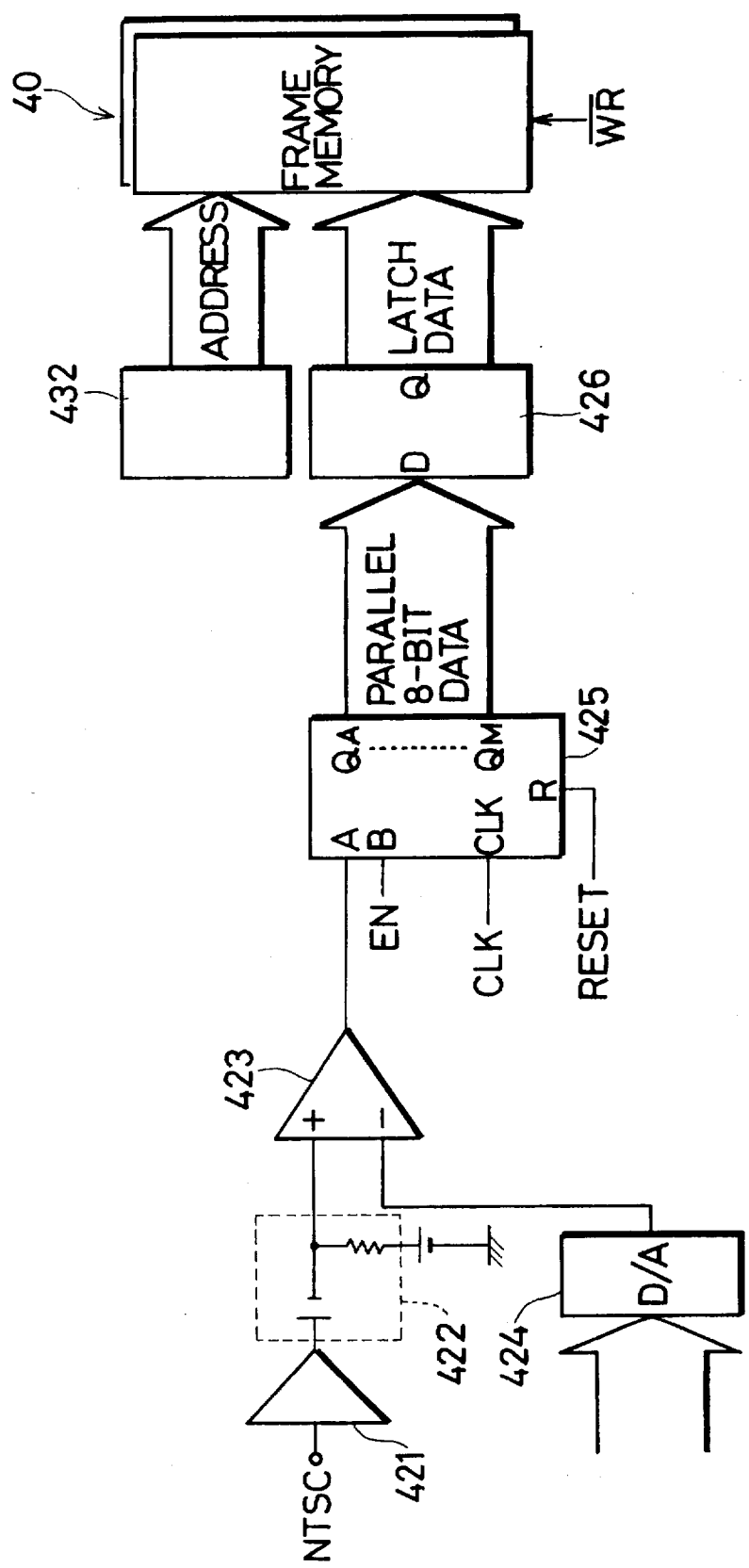
FIG. 5 is a detailed circuit diagram of a binary processing circuit.

FIG. 5 is a detailed circuit diagram of the binary processing circuit 42, and FIG. 6 is a timing chart showing its operation. In FIG. 5, indicated at 421 is an amplifier for amplifying an NTSC signal including image data from the CCD camera 6, and the thus amplified signal is converted into a signal having a specified voltage level by a circuit 422 including an AC coupling circuit. The thus converted signal is output to a noninverting input terminal of a comparator 423 including an operational amplifier. A D/A converter 424 is a digital-to-analog converting circuit and is adapted to convert a threshold data of. e.g., 8 bits input from the microcomputer 41 into an analog signal and to output the resultant signal to the inverting input terminal of the comparator 423. The comparator 423 outputs a signal of high level if the level of the NTSC signal is a threshold level or higher, and the output data thereof is sent to a serial parallel converter 425. The serial parallel converter 425 converts the received binary data into a data consisting of 8 bits in synchronization with a sampling clock and outputs the converted data to a latch circuit 426. The latch circuit 426 latches and outputs this signal to the frame memory unit 40. The binary parallel data is written in the frame memory 40 at a timing when a write pulse (bar WR) output during the reading of the data for 8 pixels is sent.

Accordingly, as shown in FIG. 6, the data is written such that the pixels of the CCD camera 6 correspond to the addresses of the frame memory unit 40: the data from the first pixel (data of ADD0) is written in an address ADD0, a data of ADD1 in an address ADD1, a data of ADD2 in an address ADD2, and so on. The employment of the D/A converter 424 in the binary processing circuit 42 to compare the levels in an analog manner enables the use of a threshold data consisting of a larger number of bits as compared with a conventional case where the digital data are compared for the NTSC signal in the high frequency band. Thus, the resolution of the level comparison can be advantageously enhanced. It will be appreciated that the invention does not deny the employment of the conventional circuit construction for comparing the digital data, and that either one of the constructions is employed in view of a required resolution accuracy.

Figure 7A:
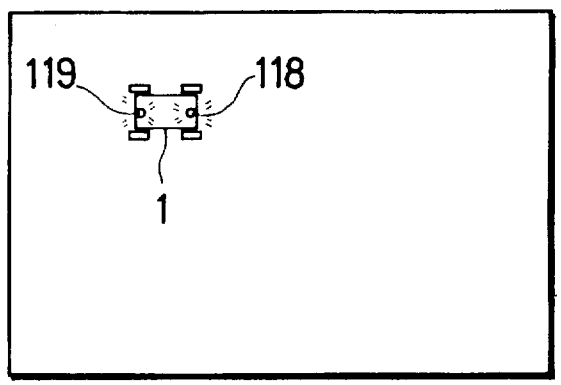
FIGS. 7A to 7C show an operation of a data reading circuit, FIG. 7A showing a base located within a view of a CCD camera, FIG. 7B showing storage contents of a frame memory in the state shown in FIG. 7A, and FIG. 7C enlargedly showing a trace block BL1.
Figure 7B:
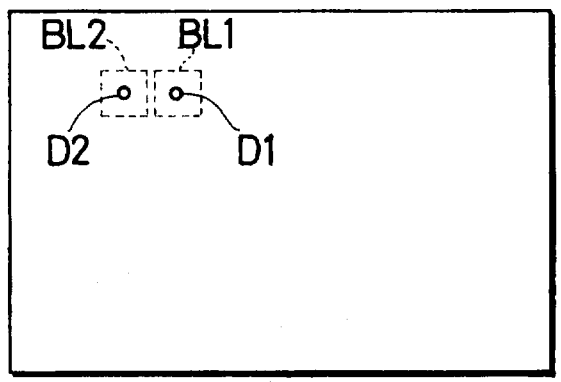
Figure 7C:
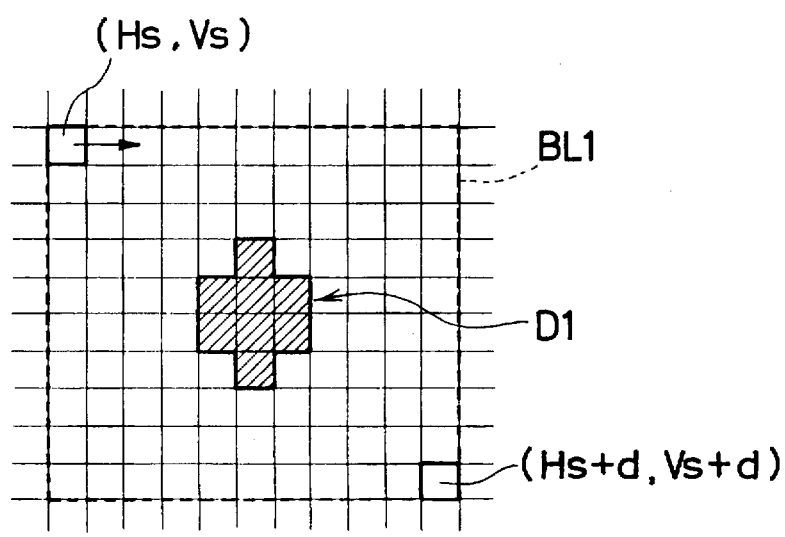

FIGS. 7A to 7C are diagrams showing the operation of the data reading circuit 48, FIG. 7A showing a base located within a view of a CCD camera, FIG. 7B showing storage contents of a frame memory in the state shown in FIG. 7A, and FIG. 7C enlargedly showing a trace block BL1.

In FIG. 7A, one car 1 is located on the base 3, and the front and rear LEDs 118 and 119 are on. In FIG. 7B, LED pixel data D1 and D2 corresponding to the front and rear LEDs 118 and 119 are stored at high level. BL1 and BL2 denote trace blocks.

In FIG. 7C, checkers within the trace block BL1 represent the pixels of the CCD camera 6, i.e., the respective addresses of the frame memory unit 40. In this embodiment, there is adopted a square trace block having a side which is at least twice as long as a distance the car 1 moves in one field cycle (half the frame cycle). In this way, the movement of the car in 360° directions can be more securely traced. The upper left end (Hs, Vs) of the trace block BL1 is a starting address of the trace block BL1, which is set by the start setting circuit 441. The H-, V-counter 442 designates the addresses in a row direction (a direction indicated by an arrow in FIG. 7C) from the starting address (Hs, Vs), i.e., (Hs+1, Vs), .. . (Hs+d, Vs). Upon the completion of one row, the address proceeds to the next row. The address designation ends at an end address (Hs+d, Vs+d). In this way, the trace block BL1 of d×d is designated.

By selecting the shape of the lens disposed on the sensing surface of the CCD camera 6 and the shape and luminance of the front and rear LEDs 118 and 119, the LED data D1 may be stored over a plurality of addresses (as in a hatched portion in FIG. 7C). By obtaining a plurality of dots, the LED data can be made distinguishable from other noises.

The integration is described with reference to FIGS. 4 and 7C. Upon the address designation of the trace block BL1 from the read address generator 44, stored contents of the addresses are successively read from the frame memory 401 (or 402). Simultaneously, the read addresses are sent to the adding circuit 481.

Each time one dot (high level data) as the LED data D1 is read from the frame memory 401, the count value of the dot counter 483 is incremented and the read dot is sent to the latch circuit 482. Only when receiving the dot data, the latch circuit 482 latches the address value output from the adding circuit 481 and sends the address value back to the adding circuit 481. In this way, each time the dot data is output from the frame memory 401, the address value for storing this dot data is output to the adding circuit 481 and integrated therein.

As a result, the number of dots existing in the trace block BL1 and the integration value of the addresses for these dots are obtained in the dot counter 483 and the latch circuit 482, respectively. Upon the completion of the address designation of the trace block BL1, the microcomputer 41 reads the data obtained in the latch circuit 482 and the dot counter 483, and discriminates based on the dot number whether the data is a LED data or a noise. A center address (Hc, Vc) of the dots is calculated by dividing the integration value by the dot number. The center address is assumed to be the position of the front LED 118. In accordance with this position data, the trace block is set and the running control signal for the car is generated.

The discrimination as to whether the data is a LED data or a noise may be made as follows. A threshold dot number is set, and the data having the dot number which is not smaller than the threshold value is discriminated to be the LED data. Alternatively, the threshold value or level of the binary processing circuit 42 may be gradually increased while the LEDs are turned off, and the threshold level where the natural light can be completely cut may be set as a threshold value.

Further, the center address may be calculated by the hardware, and the H-, V-coordinates calculation results may be sent to the microcomputer 41. Instead of the use of absolute coordinates in calculating the integration value of the coordinates, relative coordinates from reference coordinates may be used. In this case, target coordinates are obtained by adding the reference coordinates to the obtained relative coordinates at the end. This is advantageous in that the number of bits to be used is reduced and the addition by the hardware can be performed at a higher speed.

Figure 8:
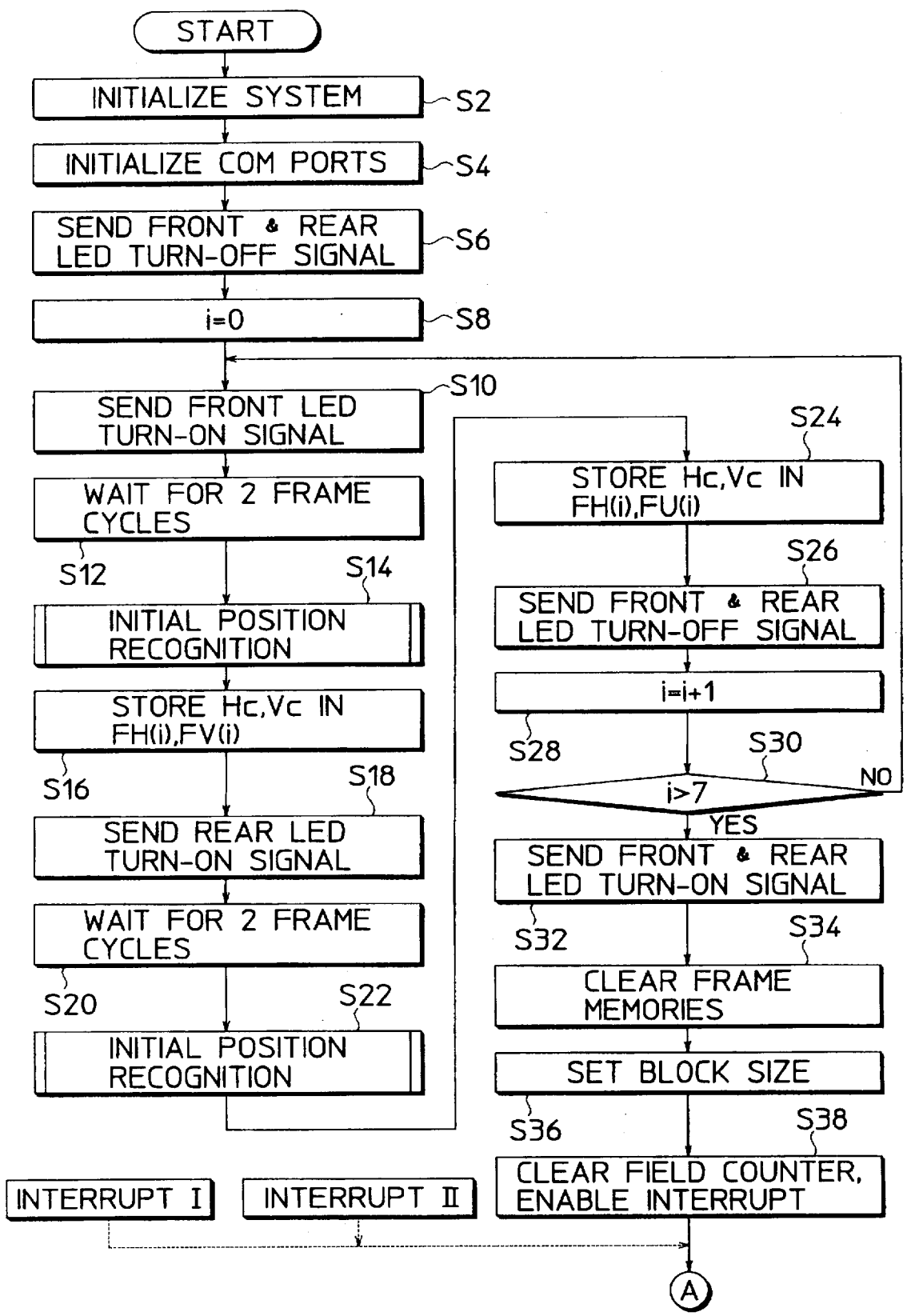
FIGS. 8 and 9 are flowcharts showing a main routine of the game machine.
Figure 9:
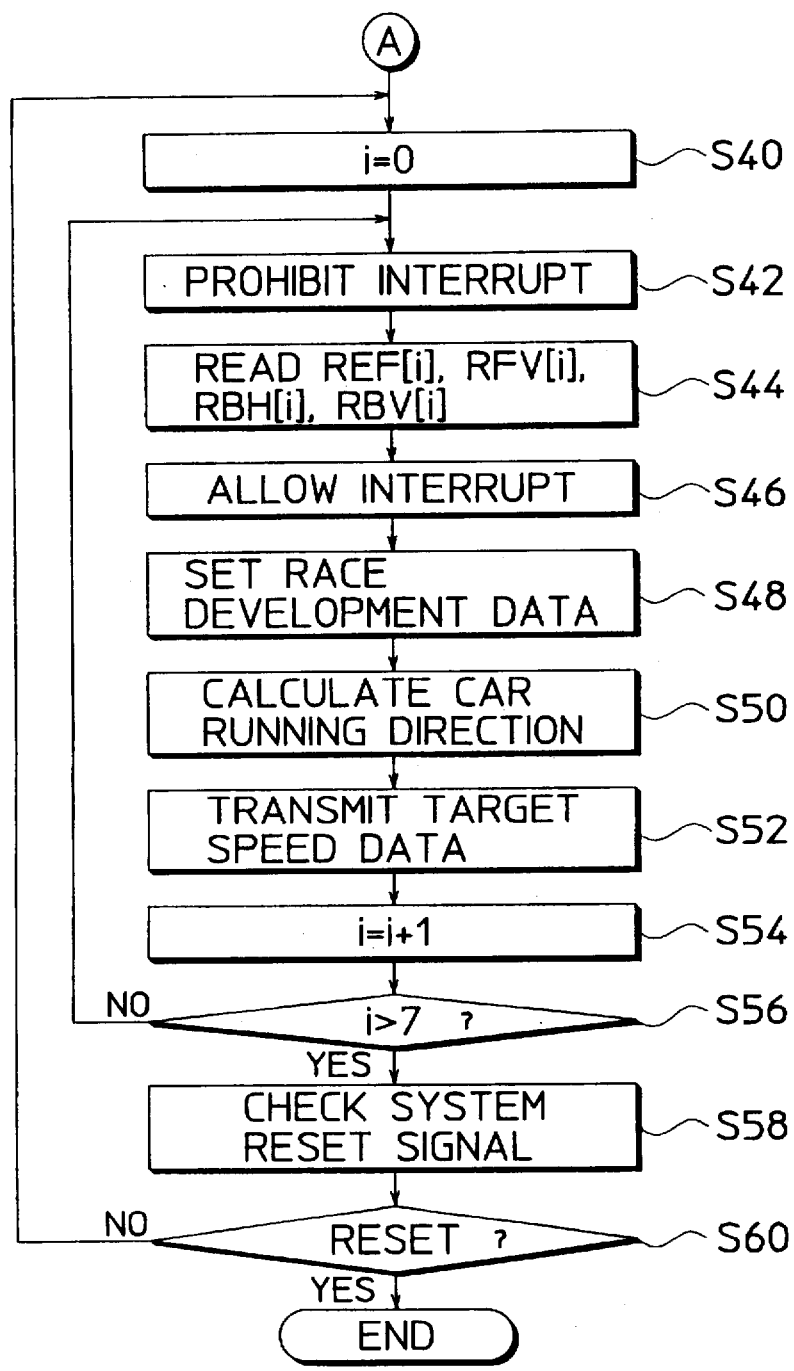

FIGS. 8 and 9 are a main flowchart showing the operation of the game machine incorporating the inventive system for controlling the movable object. In this game machine, e.g., 8 cars are used and identification numbers ID No. 1 (i=0 to 7) are given in advance to the respective cars 1 by setting dip switches provided therein.

This flowchart starts after the specified operation, e.g., insertion of a medal, or input of a predicted ranking is detected and the race development is set. First, the entire system is initialized, and communication ports of the microcomputer 41 are initialized (Steps S2 and S4). Command signals are generated to turn off the front and rear LEDs 118 and 119 of all the cars 1, and are sent to all the cars 1 via the transmission LEDs (Step S6).

A count value i of the counter is set to 0 (Step S8), and a command signal is generated to turn on the front LED 118 of the car of ID No.0, and is transmitted to this car via the transmission LEDs 7 (Step S10). The microcomputer 117 of the car of ID No.0 recognizes that the transmission command is directed to it, and turns only the front LED 118 on. On the other hand, after waiting for a time which is required for the luminance of front LED 118 to reach a specified level, e.g., for a time corresponding to 2 frame cycles following the transmission of the command signal (Step S12), the microcomputer 41 calculates the center of gravity position to recognize an initial positions of the front LED 118 of the car of ID No.0 (Step S14). This center of gravity position calculation is described in detail later. The obtained center of gravity data (Hc, Vc) is stored in the form of FH[i], FV[i] (F denotes forward) in a RAM or the like as a buffer (Step S16).

Upon the completion of the storage of the center of gravity data, a command signal is generated to turn on the rear LED 119 of the car of ID No.0, and is transmitted to this car via the transmission LEDs 7 (Step S18). The microcomputer 117 of the car of ID No.0 recognizes that the transmission command is directed to it, and turns only the rear LED 119 on. On the other hand, after waiting for 2 frame cycles following the transmission of the command signal (Step S20), the microcomputer 41 calculates the center of gravity to recognize an initial position of the rear LED 119 of the car of ID No.0 (Step S22). The obtained center of gravity data (Hc, Vc) is stored in the form of BH[i], BV[i] (B denotes back) in a RAM or the like (Step S24). Upon the completion of the storage of the center of gravity data of the front and rear LEDs 118 and 119, command signals are generated to turn off the front and rear LEDs 118 ad 119 of the car of ID No.0 and are sent to this car via the transmission LEDs 7 (Step S26). Consequently, the front and rear LEDs 118 and 119 of the car of ID No.0 are turned off.

Subsequently, the count value of the counter i is incremented by 1 (Step S28) and it is discriminated whether the count value i is in excess of 7 (Step S30). If i≦7 (NO in Step S30), this routine returns to Step S10 to carry out the aforementioned operations to the car of ID No.1, ... the car of ID No. 7. The center of gravity data for the respective cars are thus obtained and stored. If i>7 (YES in Step S30), the command signal is generated to turn on the front and rear LEDs 118 and 119 of all the cars of ID No.0 to 7 and is sent to all the cars via the transmission LEDs 7 (Step S32).

Upon the completion of the initialization, the tracing is prepared. First, the frame memories 401 and 402 are cleared (Step S34), and the size of the trace block is set (Step S36). Then, a field counter for switchingly designating the frame memories 401 and 402 is cleared to enable an interrupt, and this routine waits for an interrupt (Step S38).

Figure 10:
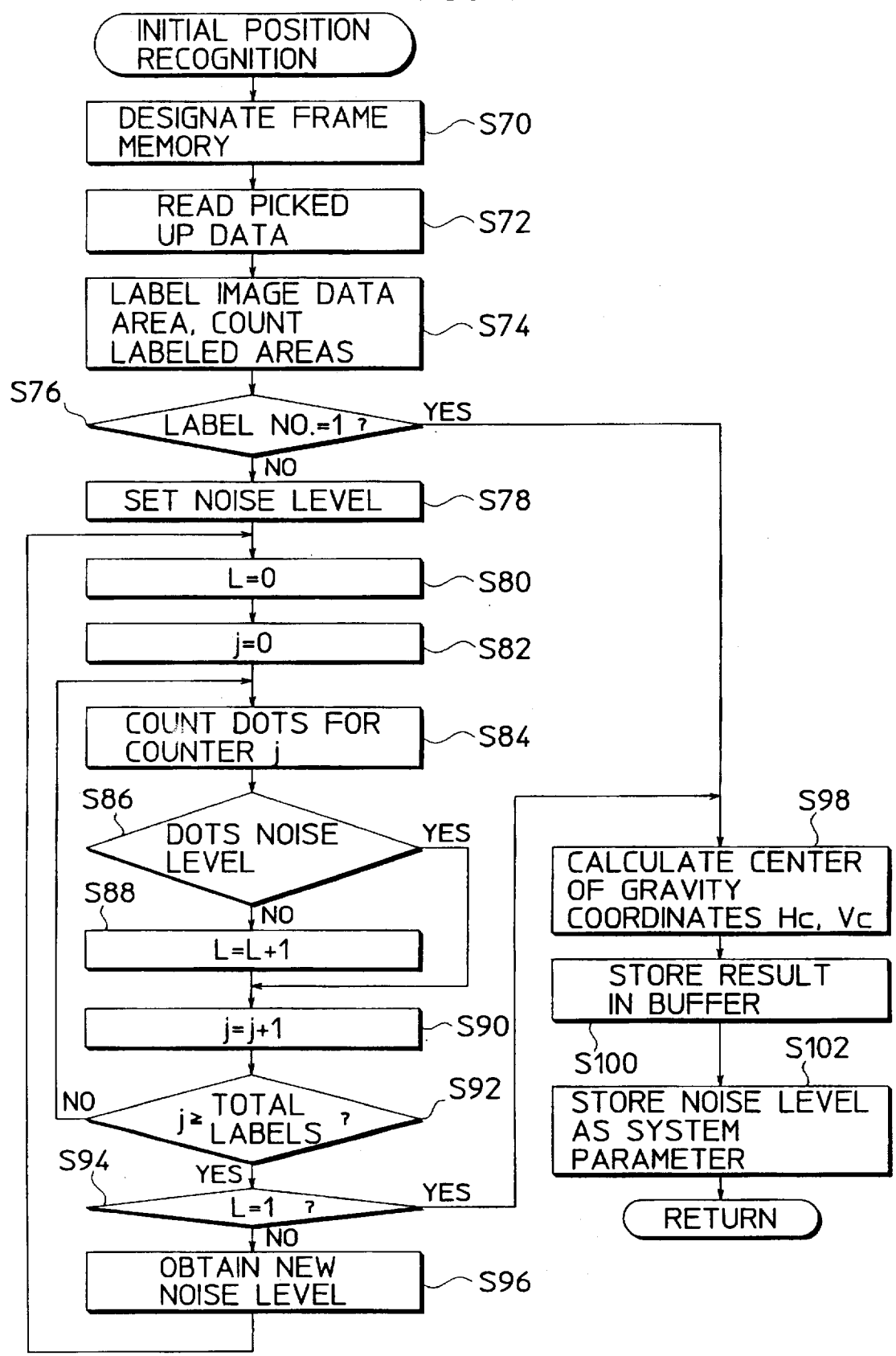
FIG. 10 is a flowchart showing a subroutine "Initial Position Recognition"

FIG. 10 is a flowchart showing a subroutine "Initial Position Recognition" carried out in Steps S14 and S22.

As described later, in tracing the cars 1, the processing is carried out in the data accumulating circuit 48 upon an interrupt. The center of gravity position calculation in the initial position recognition in Steps S14 and S22 is performed in this subroutine in order to securely prevent an erroneous calculation resulting from the presence of unnecessary reflection light, and the like.

First, the frame memory is designated (Step S70), and the picked up image data is read in the RAM of the microcomputer 41 (Step S72). The microcomputer 41 scans the read image data; detects the continuity of the dots (high level data) using a known method; labels the respective areas where the continuity is found: counts the labeled areas; and stores the counted label number (Step S74).

Subsequently, it is discriminated whether the label number is 1 (Step S76). If the label number is 2 or greater (NO in Step S76), a noise level value in a system parameter is set (Step S78). The effective label number counter L and the label counter j are set to 0, respectively (Steps S80 and S82). The dots are counted for the label corresponding to the count value 0 of the label counter j (Step S84). It is then discriminated whether the counted dot number is below the noise level (Step S86). If the dot number is not smaller than the noise level (NO in Step S86), the effective label counter L is incremented by 1 (Step S88) upon the assumption that this label is an effective label, and this subroutine proceeds to Step S90. Unless otherwise (YES in Step S86), this routine directly proceeds to Step S90 in which the label counter j is incremented. It is then discriminated whether the count value of the label counter j has reached the total label number (Step S92). Unless the count value of the counter j has reached the total label number (NO in Step S92), this routine returns to Step S84 to detect the number of the effective labels. If the count value of the counter j has reached the total label number (YES in Step S92), it is discriminated whether the count value of the counter L is 1 (Step S94). If the count value of the counter L is in excess of 1 (NO in Step S94), a new noise level having a higher threshold level which is obtained by adding 1 to the previous noise level upon the assumption that noises are still included (Step S96). Thereafter, this subroutine returns to Step S80 to carry out the aforementioned operations. This subroutine proceeds to Step S98 when the count value of the counter L becomes 1. In Step S98, the center of gravity coordinates Hc, Vc are calculated assuming that one effective label is the front LED 118 (or the rear LED 119), and the calculation result is stored in the buffer (Step S100). The center of gravity coordinates (Hc, Vc) are calculated from the following equation: Hc=a total value in H-coordinates/dot number, Vc=a total value in V-coordinates/dote number. The noise level at this stage is stored as a system parameter (Step S102), and this subroutine returns.

In Step S76, on the other hand, if the label number is 1 (YES in Step S76), the center of gravity coordinates Hc, Vc are calculated assuming that one effective label is the front LED 118 (or the rear LED 119) (Step S98), and the calculation result is stored in the buffer (Step S100). The noise level at this stage is stored as a system parameter (Step S102), and this subroutine returns.

FIG. 9 is a flowchart showing the operations carried out in response to interrupts I and II, particularly after the interrupt is enabled in Step S38.

Figure 11:
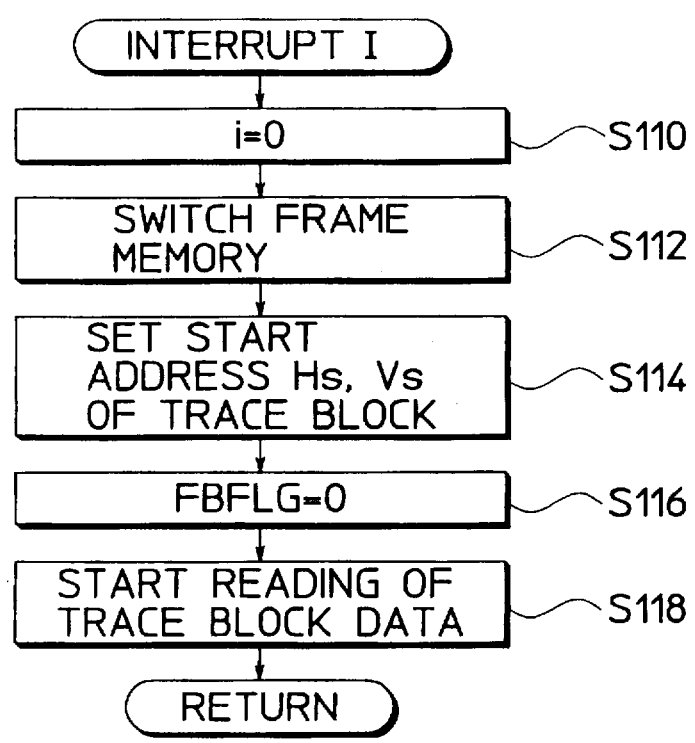
FIG. 11 is a flowchart showing a subroutine "Interrupt I"

The Interrupt I is described with reference to FIG. 11. The interrupt I is started in response to an interrupt signal generated each time the reading of the image data in the frame memory 401 (or 402) is completed. First, the identification number ID No.i is set to 0 (Step S110), and the frame memory is switched to the one in which the image data are written (Step S112). Subsequently, the start address (Hs, Vs) of the trace block labeled in correspondence with the car of ID No.0 is set (Step S114). In other words, $Hs=FH[i]-(\text{trace block size}/2)+\text{correction amount}$ $Vs=FV[i]-(\text{trace block size}/4)+\text{correction amount}$ The correction amount is given by implementing the flowchart of interrupt II.

A quotient is set at 4 in the address Vs in view of the fact that there is ½ scanning line although the image stored in the frame memory is read as a binary data by the frame. In this way, a square trace block can be obtained.

The values Hs, Vs are output to the start setting circuit 441. A flag FBFLG for indicating either one of the front and rear LEDs 118 and 119 is set to 0, i.e., the start address is set at the front LED 118 (Step S116). This routine returns after the reading of the data within the trace block is started (Step S118). The reading of the data for the front LED 118 of the car 1 of ID No.0 is carried out in the data accumulating circuit 48.

By setting the start address (Hs, Vs) such that the position of the LED 118 (or 119) is located in the center of the trace block, the movement of the car 1 can securely be traced after one frame cycle independently of the running direction of the car 1, in other words, independently of the car 1 running in any angle in 360 degrees over the plane.

Particularly, since the correction amount set based on the running speed and the direction factor is considered as described later, the tracing can be made more secure.

Instead of setting a specified traceable correction amount based on the preset highest speed of the car 1, the correction amount may be changed real-time depending upon the present running speed of the car 1 (obtained by dividing a difference between the detected positions in the last 2 frames by the frame cycle). This enables the front and rear LEDs 118 and 119 to be located as close to the center of the trace block as possible, thereby preventing the tracing error.

Figure 12:
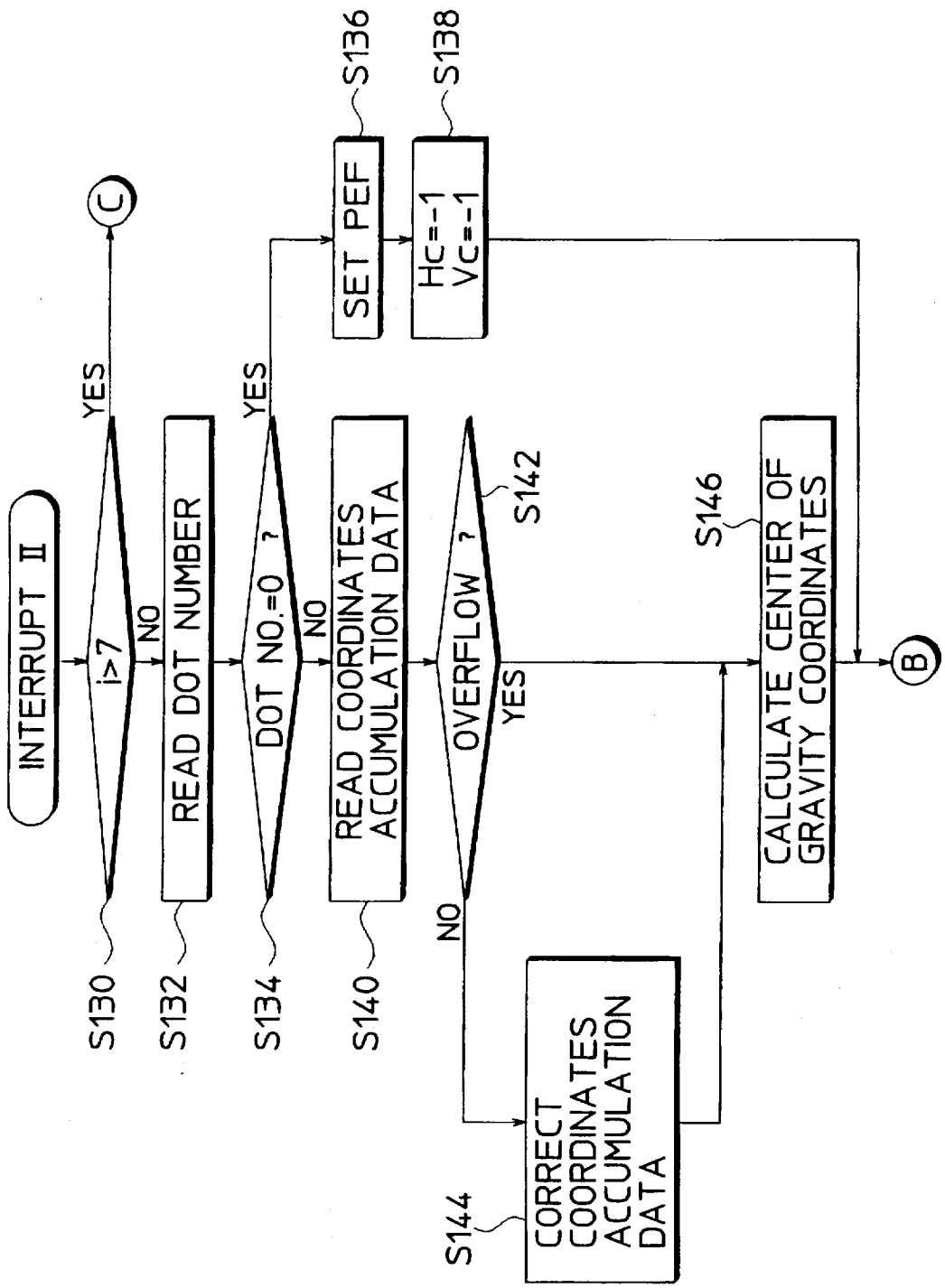
FIGS. 12 and 13 are flowcharts showing a subroutine "Interrupt II"
Figure 13:
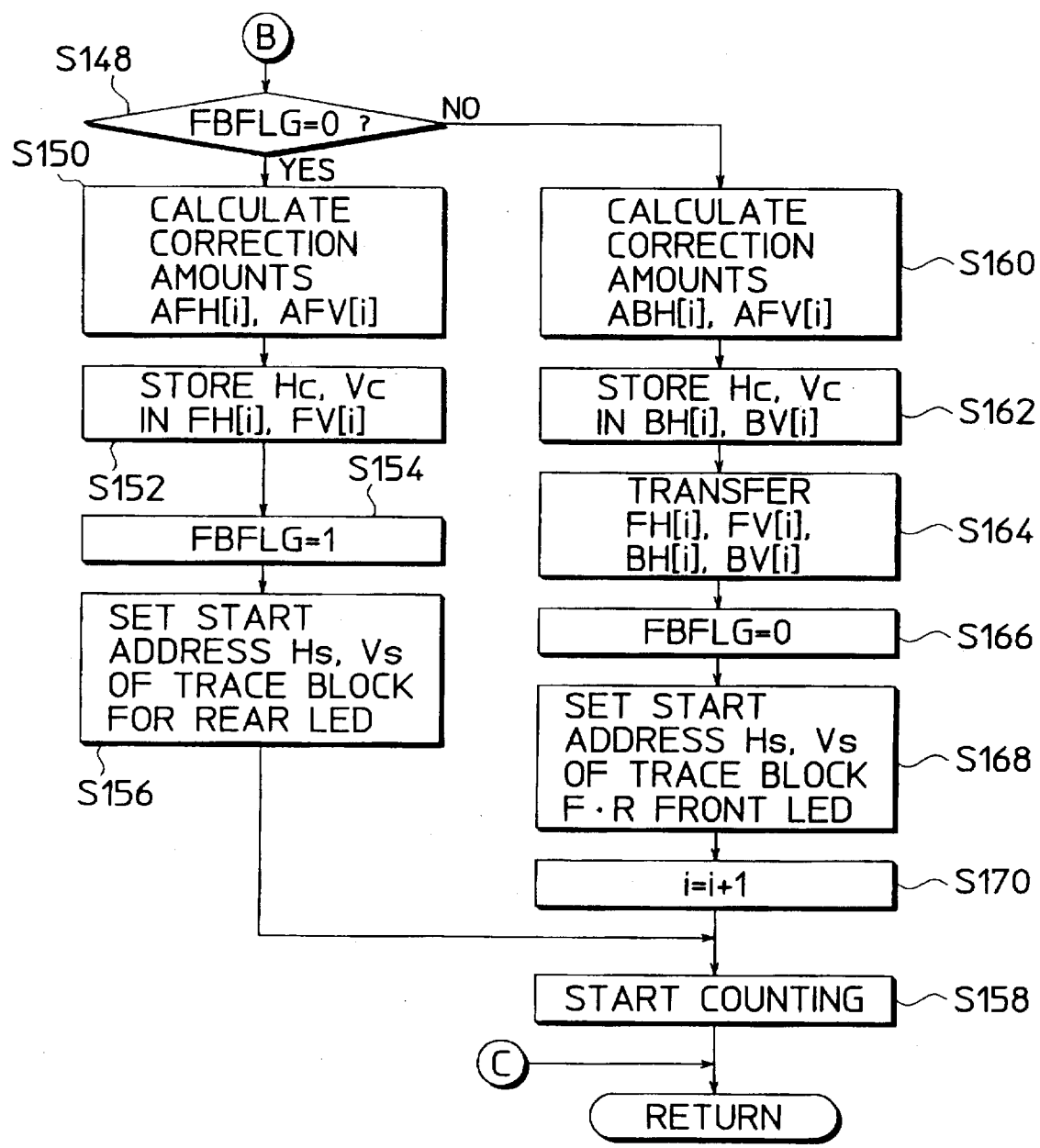

FIGS. 12 and 13 are flowcharts showing the Interrupt II.

The interrupt II is started in response to an interrupt signal generated each time the address designation of the trace block by the H-, V-counter 442 is completed. First, it is discriminated whether the count value of the counter I is smaller than 7 (Step S130). If this count value is not smaller than 7 (YES in Step S130), this routine returns upon the judgment that the tracing has been completed within one frame.

If the count value of the counter i is smaller than 7 (NO in Step S130), the dot number is read from the dot counter 483 (Step S132). It is then discriminated whether the dot number is 0 (Step S184). If the dot number is 0, a position tracing error flag PEF is set (Step S136), and (Hc, Vc)=(−1, −1) are set as a specific position data (Step S138). A position tracing error can be confirmed by this data or by monitoring the error flag PEF, and an alarm is given upon detecting the tracing error. Alternately, the trace block may be made larger than a predetermined size in case of such errors, so that the tracing can be further continued.

On the other hand, if the dot number is not 0, the coordinates accumulation data in the H- and V-directions are read from the latch circuit 482 upon the assumption that the tracing was completely made (Step S140). At this time, if the latch circuit 482 undergoes an overflow (NO in Step S142), the coordinates accumulation data are corrected (Step S144). This correction is made, for example, based on the previous center of gravity position of the LED 118 (or 119) and the running speed of the car 1, probably considering the fact that the coordinates value is large to the extent that the latch circuit 482 undergoes the overflow. On the other hand, unless the latch circuit 482 undergoes the overflow, the center of gravity coordinates in the H-, V-coordinate system are calculated based on the following equation: Hc=accumulated value in the H-direction/dot number and Vc=accumulated value in the V-direction/dot number (Step S146). It is then discriminated whether the front and rear flag FBFLG is reset (Step S148).

If the flag FBFLG is reset (YES in Step 148), it means that the position of the front LED 118 is to be detected. Accordingly, correction amounts AFH[i], AFV[i] for the trace block in the H-, and V-directions are calculated based on the Hc, Vc calculated in Step S146 and the previously calculated value FH[i], FV[i]: AFH[i]=a moved amount in the H-direction X α, AFV[i]=a moved amount in the V-direction X α (Step S150). The moved amounts in the respective H- and V-directions are obtained: FH[i]-Hc, FV[i]-Vc. Correction coefficients α, β are any values between 0 and 1, and are set to specified values in view of the set speed of the car 1, the size of the trace block, etc.

The values Hc, Vc are stored in FH[i], FV[i] corresponding to the front LED 118 (Step S152). Upon the completion of the storage, the flag FBFLG is set to "1", i.e., the starting address is set at the rear LED 119 (Step S154). Thereafter, the start address (Hs, Vs) of the trace block for the rear LED 119 is set (Step S156). In other words, the start address (Hs, Vs) is set using the following equation:

$Hs=BH[i]-(\text{trace block size}/2)+\text{correction amount}$ $Vs=BV[i]-(\text{trace block size}/4)+\text{correction amount,}$ and the counting is started (Step S158).

On the other hand, if the flag FBFLG is set at "1" in Step S148, it means that the position of the rear LED 119 is to be detected. Accordingly, correction amounts ABH[i], ABV[i] for the trace block in the H-, and V-directions are calculated based on the Hc, Vc calculated in Step S146 and the previously corresponding calculated value BH[i], BV[i]: ABH[i]=a moved amount in the H-direction X α, ABV[i]=a moved amount in the V-direction X β (Step S160). The moved amounts in the respective H- and V-directions are obtained: BH[i]-Hc, BV[i]-Vc.

The values Hc, Vc are stored in BH[i], BV[i] corresponding to the front LED 118 (Step S162).

Since the detection of the front and rear LEDs 118 and 119 of the car of ID No.i is completed, the calculated values FH[i], FV[i] and BH[i], BV[i] are temporarily transferred and stored as RFH[i], RFV[i], RBH[i], and RBV[i] in the buffer from which the data are readable in the main routine (Step S164).

Upon the completion of the transfer and storage, the flag FBFLG is reset, i.e., the position of the front LED 118 is to be detected (Step S166). Subsequently, the start address (Hs, Vs) of the trace block for the front LED 118 is set (Step S168). In other words, the start address is set using the following equation:

$Hs=FH[i]-(\text{trace block size}/2)+\text{correction amount}$ $Vs=FV[i]-(\text{trace block size}/4)+\text{correction amount.}$ Then, the count value of the counter i is incremented by 1 (Step S170), and the counting is started (Step S158), thereby repeating the aforementioned operations for the trace block of the next car 1.

Referring back to FIG. 9, after transferring the calculated values upon the completion of the Interrupt II, the identification number ID No.i is set to 0 (Step S40), and any more interrupt is prohibited (Step S42). The position data of the front and rear LEDs 118 and 119, i.e., RFH[i], RFV[i] and RBH[i], RBV[i] are read from the buffer (Step S44). The interrupts are allowed again upon the completion of this reading (Step S46). Since the data transfer by the Interrupt II is repeated between Steps S38 and S60, Steps S42 and S46 are provided to prevent the reading of the erroneous data even if the reading of the data from the buffer and the data transfer by the interrupt II are carried out at the same timing.

The relationship between the position of the car 1 and the front and rear LEDs 118, 119 is predetermined. For example, the position of the car 1 may be an intermediate position of the front and rear LEDs 118 and 119. Upon determining the position of the car 1, the race development data, i.e., a goal position data and the speed data are set (Step S48). The goal position data is given to each car, and is a position data for designating passing points on the race track 2 at specified intervals.

The running direction of the car 1 is calculated based on the present goal position and the detected position of the car 1 (Step S50). Further, a direction correction amount of the car 1 is calculated based on a target direction (direction toward the goal position) and the facing direction of the car 1 (which is calculated based on the positions of the front and rear LEDs 118 and 119 of the car 1). If the goal direction is calculated based on the data in three points: the present position, the next position and the further next position, the car 1 is capable of running more smoothly along the predetermined course. The speed and the direction are instructed to the car 1 based only on a goal speed data. More specifically, the speed instruction is given to one of the specific wheels, e.g., the motor 113 for driving the wheel 111, and the direction instruction is given in the form of a speed difference from the rotating speed of the motor 113. The direction can also be controlled by individually instructing the rotating speeds to the respective motors 113 and 114.

The obtained goal speed data is transmitted to the car 1 of the corresponding ID number via the transmission LEDs 7 (Step S52), and the count value of the counter i is incremented by 1 (Step S54). It is then discriminated whether the count value of the counter i is larger than 7 (Step S56). This routine returns to Step S42 if this count value is not larger than 7. If this count value is larger than 7, a system reset signal is checked (Step S58). The system reset signal is output in the case where an abnormality occurs in the system or when the race finishes.

If the system reset signal is not reset (NO in Step S60), this routine returns to Step S40 in which the count value of the counter i is set to "0". In this way, the running control for the cars 1 is continued until the race finishes. On the other hand, if the system reset signal is reset, this routine ends upon the judgment that the race has finished.

Although the initial position recognition (Steps S14 and S22) and the position detection during the tracing are performed by the different circuits in this embodiment, they may be performed by the single circuit. Further, although the position recognition is performed by individually turning on the front and rear LEDs 118 and 119 in the initial position recognition, it may be performed as follows. First, only the front LED 118 is turned on, and the front and rear LEDs 118 and 119 are turned on at a next timing. The position of the rear LED 119 is recognized by omitting the already recognized position of the front LED 118. This method requires only three kinds of control signals for the front and rear LEDs 118 and 119: one for turning the both LEDs 118 and 119 off, one for turning only the front LED 118 on, and one for turning the both LEDs 118 and 119 on. Further, a waiting period may be set based on the factor other than the frame in order to prevent a delay between the timing at which the front and rear LEDs 118 and 119 are turned on and the image pick-up timing so that the image can be securely picked up while the LEDs 118 and 119 are on.

Figure 14:
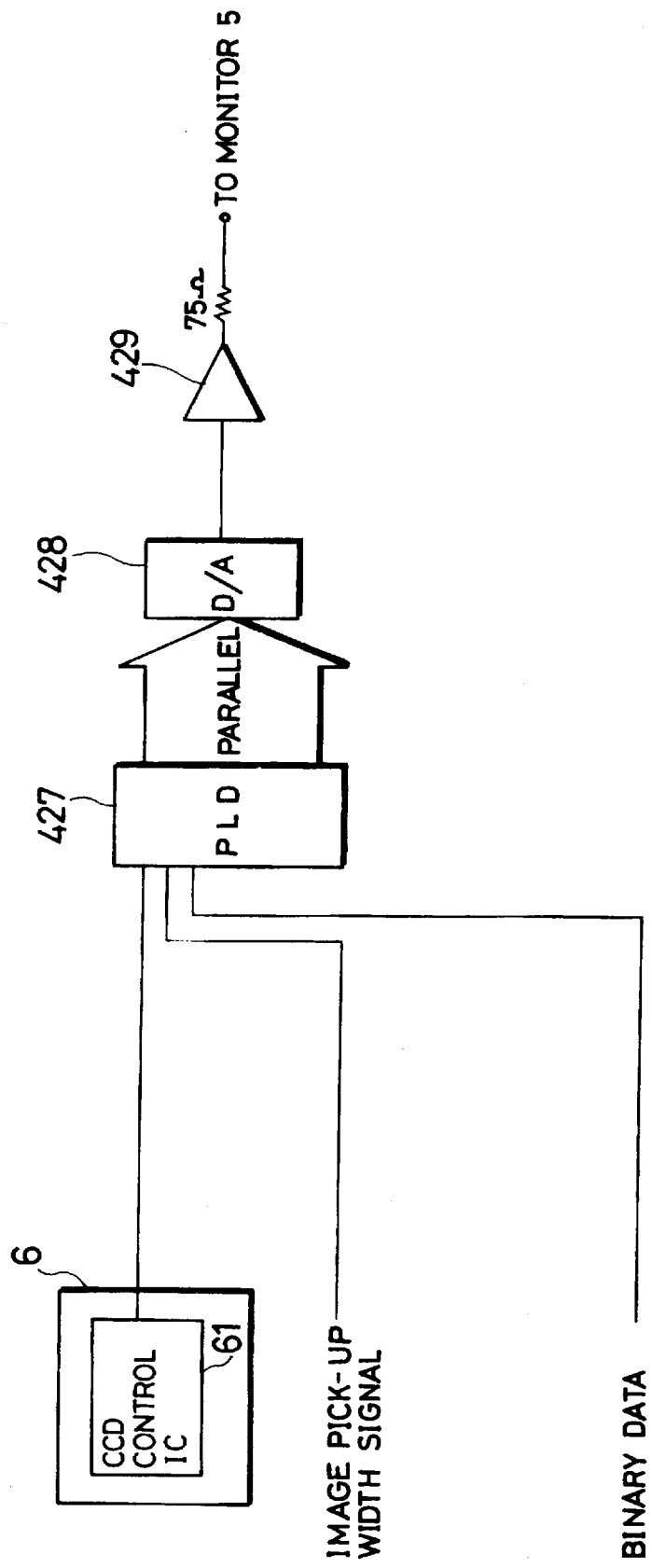
FIG. 14 is a diagram of a circuit provided in the binary processing circuit to display a binary image on an NTSC monitor prepared to see a binary data of a video image.
Figure 15:
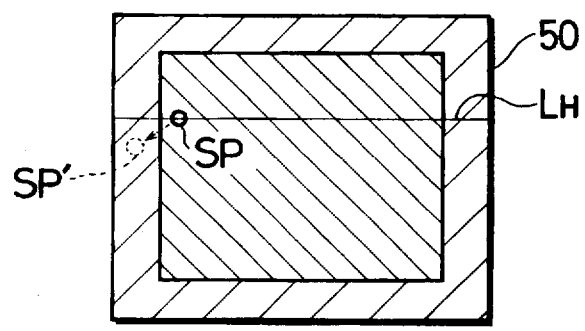
FIG. 15 is a diagram showing one example of a monitor image.
Figure 16:
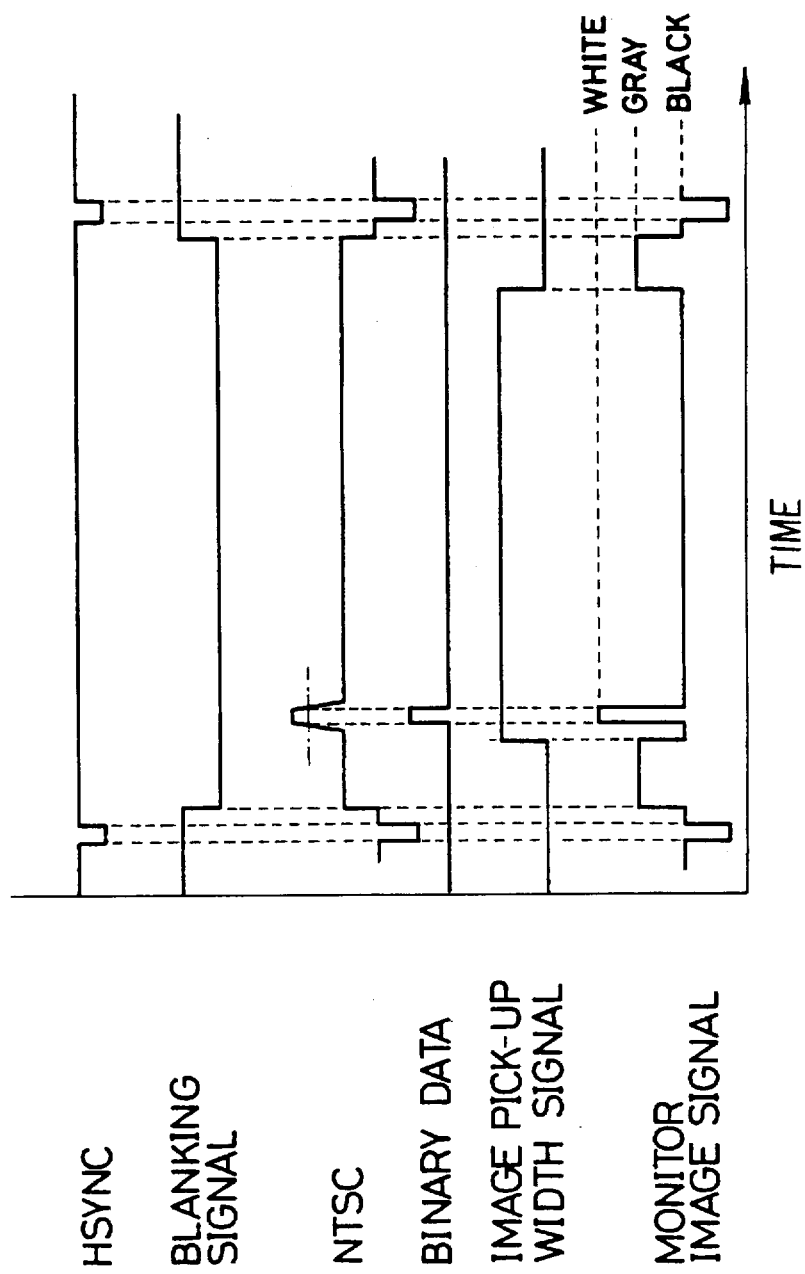
FIG. 16 is a waveform chart showing waveforms of signals along one horizontal line LH.
Figure 17:
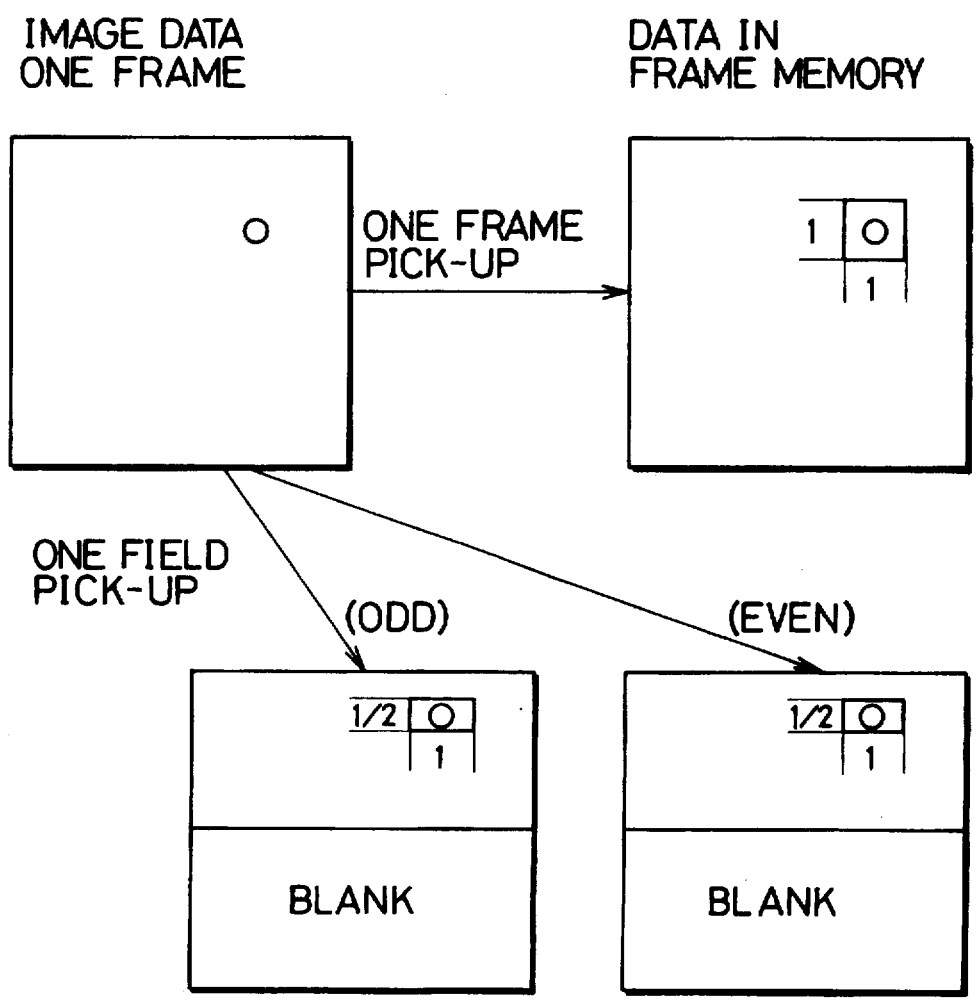
FIG. 17 is a diagram showing that the images in the frame memory are converted into binary data by the frame, whereas the number of a scanning line is ½.

How an image pick-up area on the base 3 is set by the CCD camera 6 is described next with reference to FIGS. 14 to 16. FIG. 14 is a diagram of a circuit provided in the binary processing circuit to display a binary image on an NTSC monitor prepared to see a binary data of a video image. FIG. 15 is a diagram of one example of a monitor image. FIG. 16 is a waveform chart showing waveforms of signals along one horizontal line LH shown in FIG. 15. This monitor image is used for a check during the manufacturing, maintenance, etc.

Indicated at 427 is an NTSC generator which receives an HSYN signal as a composite SYNC signal and a blanking signal from a CCD control IC 61 of the CCD camera 6, an image pick-up width signal for designating the image pick-up area which signal is output from the microcomputer 41 to the frame memory unit 40, and the binary data of the image data. The NTSC generator 427 generates an NTSC signal from the HSYN signal, the blanking signal, and the binary data, and outputs an image signal converted into an intermediate level only during a period except a high period of the image pick-up width signal. Further, an image pick-up width signal in the vertical direction is used according to the similar method. Accordingly, on a screen 50 of the monitor 5, a position SP where the light from the infrared emitter (such as an LED) is received is displayed in white level, the area defined by the image pick-up width signal is displayed in black level, and the region outside the image pick-up area is displayed in gray level. The view of the CCD camera 6 is adjusted based on the position SP in the black level area on the base 3 and a position SP' in the gray level area such that the area desired to perform the position tracing for the car 1 coincides with the black level area. In this way, the tracing area can be set in or adjusted relative to the desired area on the base 3.

Figure 18:
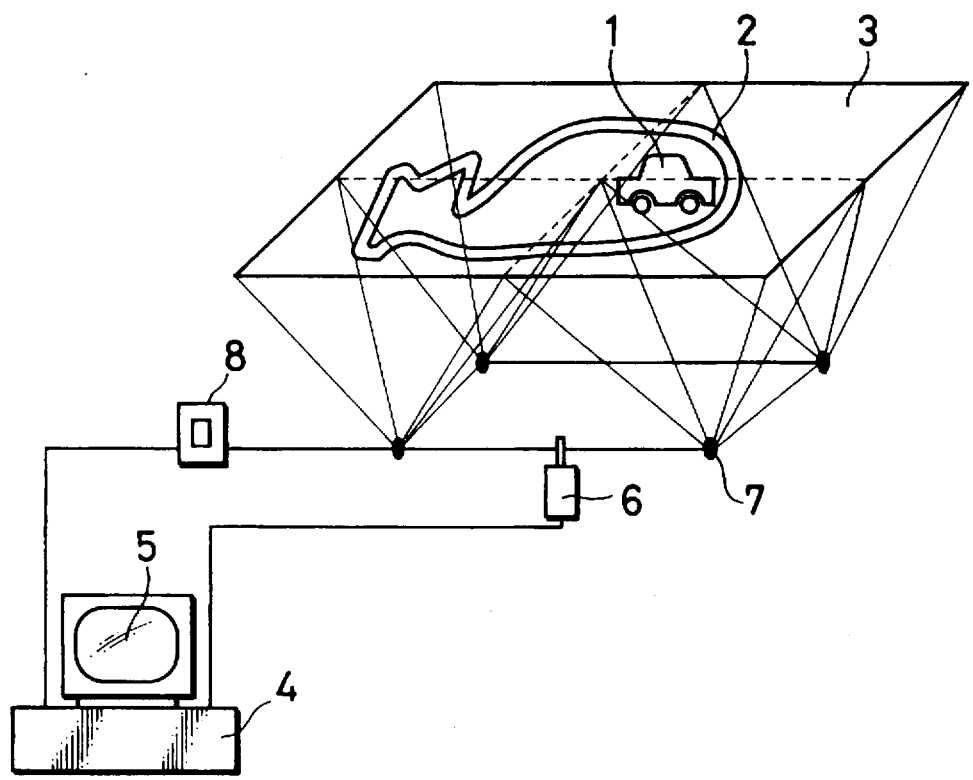
FIG. 18 is a perspective view entirely showing another game machine embodying the present invention.

As shown in FIG. 18, the CCD camera 6 may be disposed to face upward below the base 3 instead of above the base 3, by using a transparent base 3. In this case, if the devices for transmitting and receiving the signals are disposed such that the optical communication between the car 1 and the machine main body can be conducted via the base 3, the game participants can enjoy the game on the base 3.

More specifically, in FIG. 18, the base 3 is formed of glass or like transparent material on the upper surface of which the race track 2 is drawn to simulate the circuit. The car 1 runs on the upper surface of the base 3. The CCD camera 6 and the transmission LEDs 7 of the machine main body are disposed below the base 3 with faced upward. On the other hand, the front and rear LEDs 118 and 119, and the infrared receiving unit 121 are disposed in specified positions on the bottom surface of the body of the car 1 so as to face the CCD camera 6 and the transmission LEDs 7.

Figure 19:
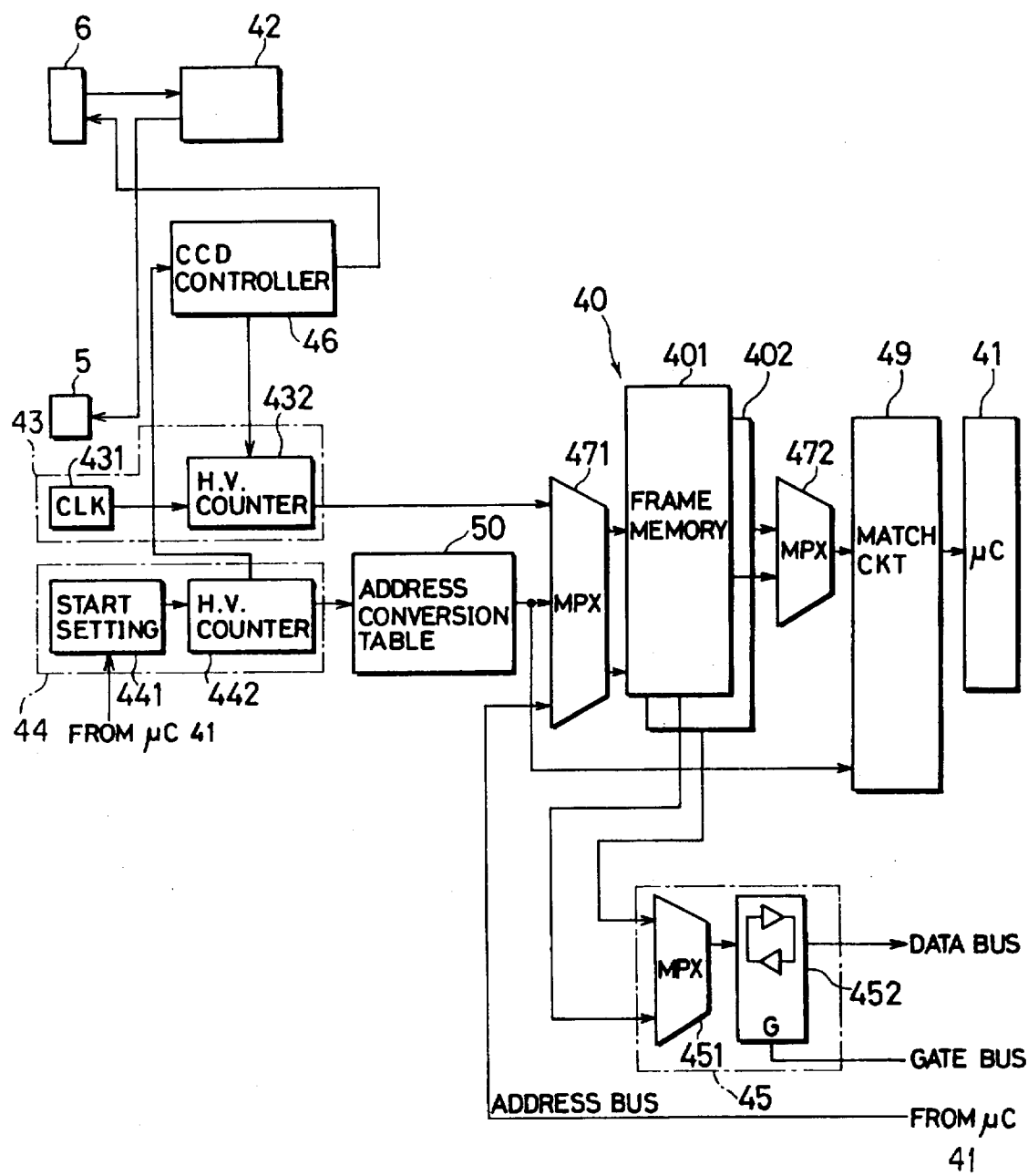
FIG. 19 is a block diagram, corresponding to FIG. 2, of the another game machine.

FIG. 19, similar to FIG. 2, is a block construction diagram of another embodiment. In the embodiment shown in FIG. 19, a pattern matching circuit 49 is provided in place of the data accumulating circuit 48, and an address conversion table 50 is provided between the H-, V-counter 442 and the multiplexer 471 and between the H-, V-counter 442 and the pattern matching circuit 49. The other construction and operation are same as the embodiment shown in FIG. 2.

Figure 20A:
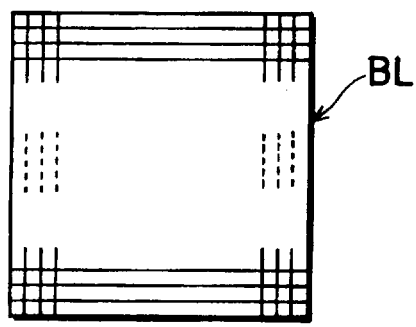
FIGS. 20A to 20D, corresponding to FIG. 7C, show a data accumulation, FIG. 20A showing a trace block BL.
Figure 20B:
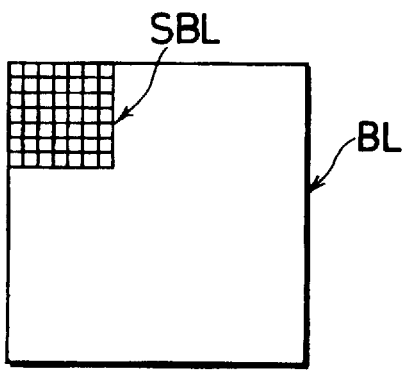
Figure 20C:
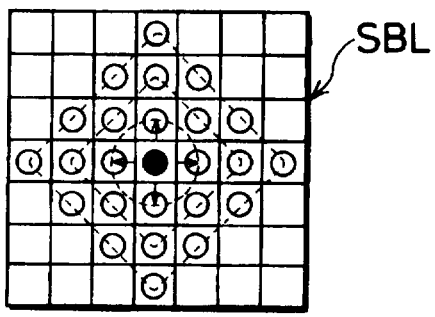
Figure 20D:
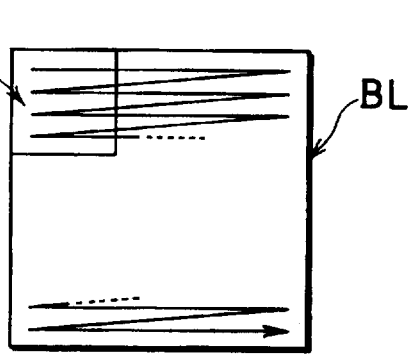

The operation of the pattern matching circuit 49 is described with reference to FIG. 20. FIGS. 20A to 20D, corresponding to FIG. 7C, show a date accumulation, FIG. 20A showing a trace block BL, FIG. 20B showing a sub-trace block SBL, FIG. 20C exemplarily showing how dots are detected, FIG. 20D showing a method for scanning the sub-trace block SBL in the trace block BL.

The size of the trace block BL is defined, for example, by pixels arranged in a 16×16 matrix as shown in FIG. 20A. Within the trace block BL, a sub-trace block SBL consisting of pixels arranged in a 7×7 matrix is set.

Detection of dots in the sub-trace block SBL will be described in accordance with a flowchart shown in FIG. 21, referring to FIGS. 20B to 20D.

First, the present trace block BL for the front LED 118 (or the rear LED 113) is set based on the previously detected position and the moving speed and direction of the car 1 (Step S200). A value n for determining a setting order of the sub-trace block SBL is set to "1" (Step S202). More specifically, the first sub-trace block SBL is set at the upper left corner within the trace block BL (Step S204, see FIG. 20B). The dot detection is carried out to the center position (indicated by a black point in FIG. 20C) of the first sub-trace block (Step S206). It is then discriminated whether any dot has been detected (Step S208). Upon detecting the dot, the dot value of one is put in an unillustrated dot counter (Step S210). If no dot has been detected, the value n is incremented by 1 upon the judgment that the LED is not located within this sub-trace block SBL (Step S232), and the dot detection is carried onto the next sub-trace block. The next sub-trace block is set by shifting the previous sub-trace block to the right by one pixel. Upon reaching the right end, the sub-trace block is returned to the left end and is shifted downward by one pixel. The sub-trace block may be shifted to the right or downward by two pixels, or the scanning of the sub-trace block SBL may be started from a position other than the upper left corner position. In this embodiment, the H-, V-counter 442 generates the addresses in the order corresponding to the designated pixels of the sub-trace blocks SBL.

Subsequently, the dot detection is sequentially carried out to four pixels surrounding the center pixel (four pixels located on an innermost circle of dotted line in FIG. 20C) (Step S212) and it is discriminated whether the dot exists in any of the four pixels (Step S214). If four dots have been detected, the count value of the dot counter is incremented by 4 (Step S216). Unless otherwise, the value n is incremented by 1 upon the judgment that the LED is not located within this sub-trace block SBL (Step S232), and the dot detection is carried onto the next sub-trace block.

Subsequently, the dot detection is sequentially carried out to eight pixels (located on an intermediate circle of dotted line in FIG. 20C) (Step S218), the count value of the dot counter is incremented by the number of the detected dot(s) (Step S220). Further, the dot detection is sequentially carried out to twelve pixels (located on an outermost circle of dotted line in FIG. 20C) (Step S222), the count value of the dot counter is incremented by the number of the detected dot(s) (Step S224). After accumulating all the dots existing within the rhombic area in the sub-trace block SBL, the dot number in the previous sub-trace block SBL and the dot number in the present sub-trace block SBL are compared (Step S226). The larger dot number and the center pixel data of the sub-trace block SBL corresponding to the larger dot number are stored (Step S228). It is then discriminated whether the value n is larger than N. i.e., the scanning has reached the last sub-trace block SBL located in the lower right corner of the trace block BL (Step S230). If the scanning has not yet been completed (NO in Step S230), this routine proceeds to Step S232 to carry out the aforementioned operations to the next sub-trace block. This routine ends if the scanning has been completed.

Finally, the center pixel data corresponding to the largest dot number is set as a center address (Hc, Vc) of the front LED 118 (or the rear LED 119). Thereafter, the next trace block BL is set, taking into account the running speed and direction of the car 1 as in the foregoing embodiment. As described above, according to this embodiment, the scanning is carried onto the next sub-trace block based on the presence of the dot in the single center pixel or five pixels including the center pixel and the four surrounding pixels. Thus, the scanning according to this embodiment is more rapid than the scanning according to the foregoing embodiment in which all the pixels within the trace block BL are scanned, and the size of the circuits can be made smaller.

The address conversion table 50 is described. In the CCD camera 6 such as a television camera, a single concave lens is generally disposed to entirely cover the surface where pixels are arranged in a matrix. In this case, the picked-up image is distorted due to the influence of the distortion of the lens. Particularly, this distortion becomes more remarkable at the periphery of the lens. The address conversion table 50 is provided to correct the displacement resulting from the distortion.

Figure 22A:
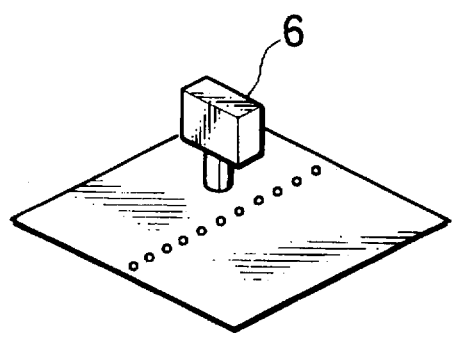
FIGS. 22A and 22B are a perspective view and a vertical section showing a lens distortion measurement.
Figure 22B:
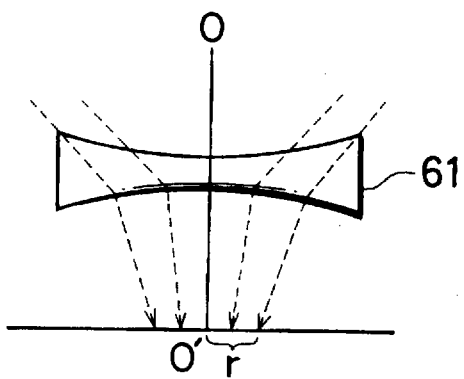
Figure 23A:
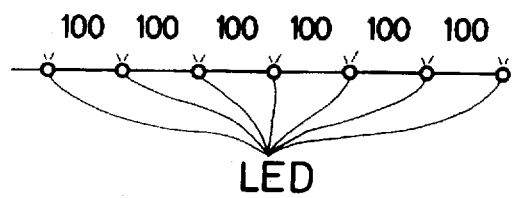
FIGS. 23A, 23B and 23C show the relationship between actual positions of adjustment LEDs at adjusting points and the positions thereof as reception light data.
Figure 23B:
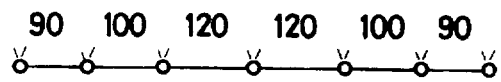
Figure 23C:
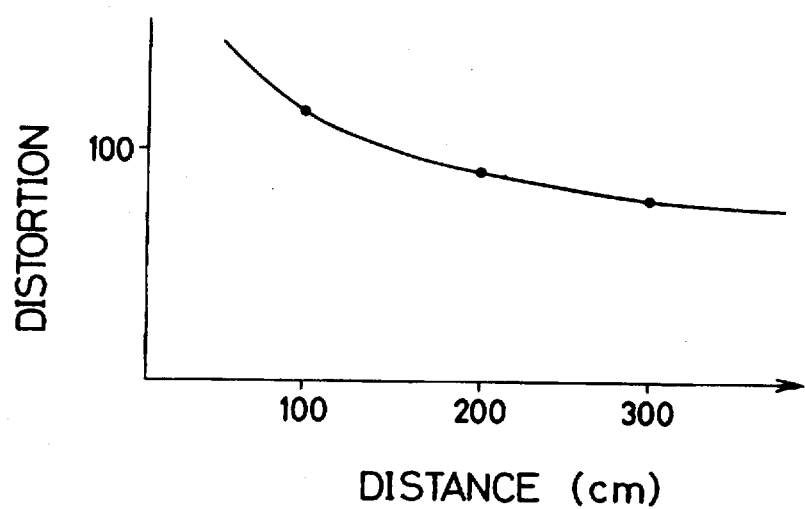

The above is described in more detailed with reference to FIGS. 22 to 24. FIGS. 22A and 22B are a perspective view and a vertical section showing a lens distortion measurement. FIGS. 23A, 23B and 23C show the relationship between actual positions of adjustment LEDs at adjusting points and the positions thereof as reception light data, FIG. 23A showing an actual image space, FIG. 23B showing a virtual image space, and FIG. 23C being a graph showing the relationship between a distance from a principle point and the distortion. FIGS. 24A. 24B and 24C show the position correction on a measurement surface, FIG. 24A showing an actual image space, FIG. 24B showing a virtual image space, and FIG. 24C being a conversion table for correction data. The CCD camera 6 is spaced apart from a measurement surface by a specified distance such that an optical axis O-O' of a concave lens 61 is normal to the measurement surface.

The distortion of the lens is expressed in a function of a horizontal distance r from a principle point O'. The distortion also depends upon the distance between the CCD camera 6 and the measurement plane. However, since a distance between the base 3 and the CCD 6 is predetermined in actual equipments, the above factor needs not be considered if the distortion is so measured as to conform to the set distance.

As shown in FIG. 23A, an actual image space is formed by arranging the adjustment LEDs in a plurality of adjusting points at specified intervals on a straight line including the principle point O'. When the lights emitted from the adjustment LEDs are received by the CCD camera 6 via the lens 61, the images of the adjustment LEDs are obtained in a distorted image space including the distortion (see FIG. 23B). As shown in FIG. 23C, the distortion is positive (enlargement) near the principle point O', and becomes smaller as the distance from the principle point O' becomes longer. The distortion becomes O in a certain point, and becomes more negative (reduction) as the distance from the principle point O' becomes longer than this certain point. It can be seen that the distortion is substantially inversely proportional to the distance from the principle point O'. A distortion coefficient C(r) used to correct the distortion is obtained as:

$$C(r)=r'/r$$

where r denotes a distance in the actual image space and r' denotes a distance in the distorted image space. The distortion is also considered to be direction-dependent. In this case, the adjustment LEDs may be disposed by 90 degrees to conduct the measurement in four directions. The correction calculation is performed for all positions on the measurement plane, using the distortion coefficient C(r). The positions are corrected between the distorted image space and the actual image space. The correction results are written in advance in the address conversion table 50.

FIGS. 24A to 24C show exemplarily contents of the address conversion table 50. When addresses on the measurement surface are (0000) to (FFFF), three points (50, 80), (60, 10) and (60, C0) in the actual image space are expressed as (70, 80), (70, 50) and (70, B0) in the distorted image space. Accordingly, in conducting the position detection, the addresses (50, 80), (60, 10) and (60, C0) in the actual image space designate the addresses (70, 80), (70, 50) and (70, B0) in the distorted image space via the address conversion table 50. In accordance with the addresses in the distorted image space, the image stored in the frame memory unit 40 with being distorted is read, and the position of the front LED 118 (or the rear LED 119) is detected.

The microcomputer 41 monitors the address ((Hs, Vs) in this embodiment) which it has generated at a timing when the pattern matching circuit 49 detects the position of the front LED 118 (or the rear LED 119), in other words, the address of the sub-trace block SBL in the actual image space which it has formed at the count timing of the H-, V-counter 442 via the address conversion table 50, and then recognizes this address as the position of the front LED 118 (or the rear LED 119) in the actual image space. In this way, the microcomputer 41 can in substance conduct the position detection in the distorted image space using the sub-trace block SBL in the actual image space. The microcomputer 41 executes the necessary calculation such as the tracing of the car 1 in accordance with the address detected substantially in the actual image space (in this example, an actual space).

The above example is described by making a correspondence between the actual image space corresponding to the microcomputer 41 and the distorted image space corresponding to the frame memory unit 40. However, it is sufficient to define a one-to-one correspondence between the distorted image space and another image space which is not limited to the actual image space. For example, this image space may be a specified virtual image space of the microcomputer 41. In this case, it is necessary to express all position data concerning this system including the position data for the game development and the position data of the track in the same virtual image space. If the running of the car 1 is controlled after the initialization in the virtual image space, there can be performed a running control which is read and similar to the running control in the actual image space. The optical axis of the CCD camera 6 needs to be normal to the surface of the base 3. However, if the inventive system is installed in, for example, a game machine over a long term, it may be displaced from its vertical posture due to changes over time or due to the inclination of the surface of the base 3 and the CCD camera 6 resulting from the vibrations and impacts given from players. If the vertical posture is displaced, there may be a discrepancy between the position of the car 1 which is detected using the image picked up by the CCD camera 6 and the actual position, i.e., the position of the race track 2 on the base 3, thereby making it impossible to perform an accurate running control. In order to avoid this problem, the posture may be corrected regularly or upon finding an abnormality. However, this adjustment is disadvantageous in terms of the working efficiency because it is complicated and the posture displacement may not be properly corrected. In view thereof, it is desirable to automatically correct the posture displacement by means of the image processing.

Figure 25A:
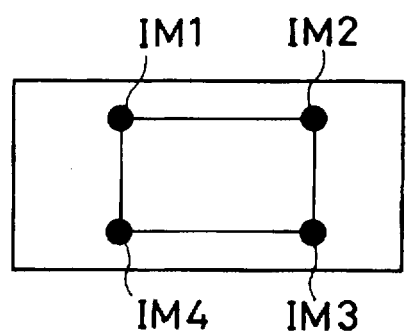
FIGS. 25A and 25B show a posture displacement and its correction, FIG. 25A showing a proper position where the posture is not displaced or after the image processing, and FIG. 25B showing the position of the image when the posture is displaced.
Figure 25B:
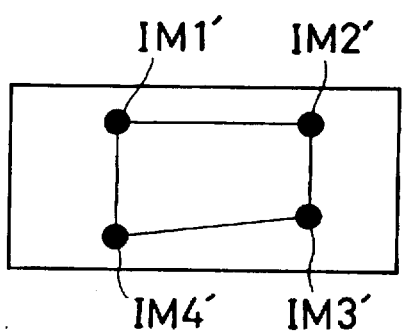

FIGS. 25A and 25B are diagrams showing the posture displacement and its correction, FIG. 25A showing proper positions of images when there is no posture displacement or after the image processing, and FIG. 25B showing displaced positions of the images.

In a state where the CCD camera 6 is mounted such that its optical axis is normal to the surface of the base 3 above (see FIG. 1) or below (see FIG. 18) it, for example, a rectangle having a center of gravity where the optical axis is located is assumed, e.g., when the game machine is installed, and four correction LEDs are disposed in advance at four corners of this rectangle (left and right corners at the front side, and left and right corners at the rear side). At the time of the initial installation, the positions of the images of the respective four correction LEDs are detected in connection with the adjustment LEDs using the aforementioned detecting method. This state is shown with images IM1 to IM4 corresponding to the four correction LEDs in FIG. 25A. Address distances between the images IM1 and IM2, between the images IM3 and IM4, between the images IM2 and IM3, and between the images IM4 and IM1 are calculated. In this case, the address distance between the images IM1 and IM2 is the same as that between the images IM3 and IM4, and the address distance between the images IM2 and IM3 is the same as that between the images IM4 and IM1. The address distances in the longitudinal and lateral directions can be stored in a reference value memory provided in the microcomputer 41.

Thereafter, the following inclination correction is performed regularly or in the initialization routine carried out each time the game machine incorporating the inventive system is started.

In the inclination correction, first, the four correction LEDs are simultaneously or sequentially turned on, and the positions of the correction LEDs are detected in the form of addresses in the frame memory unit 40. Let it be assumed that this state is shown by images IM1' to IM4' in FIG. 25B. The address distances between the images IM1' and IM2', between the images IM3' and IM4', between the images IM2' and IM3', and between the images IM4' and IM1' are calculated. Then, an address ratio, i.e., reference address distance/present address distance is obtained with respect to each of four directions extending from the center of gravity to the front, rear, left and right sides. The address ratios in these four directions represent a direction and an angle of inclination of the optical axis of the CCD camera 6 with respect to the surface of the base 3. A conversion table for inclination correction addresses is generated in correspondence with all the addresses of the frame memory unit 40, using the address ratios in the four directions and a center address as a reference. A memory for storing this conversion table is provided in the microcomputer 41, and the contents of the conversion table is overwritten each time the inclination correction is performed.

Having the conversion table for the inclination correction, the microcomputer 41 can always suitably correct the address position detected for the car 1. Thus, the microcomputer 41 can grasp the actual position of the car 1 running on the base 3, performing an accurate running control.

Although members for emitting and receiving infrared radiations are used as communication means between the car 1 and the machine main body in the foregoing embodiment, members for transmitting and receiving radio waves or ultrasonic waves may also be used.

Although the cars performing a car race are controlled in the foregoing embodiment, the invention is not limited to this. The invention may be applied to another race game such as a horse race or a boat race, or may be applied to control a specific movement of one movable object. Further, the invention is not limited to the control for the movable object on the surface (including a curved surface), but may be applied to a control for a movable object which moves linearly along a line, fly or floats in the air or in the liquid.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A racing game system for remotely controlling a movable object comprising:

- a drive controller, disposed on the movable object, for controlling driving of the movable object in accordance with movement data;
- an emitter device, disposed on the movable object, for emitting light;
- a light sensor for receiving light emitted from the emitter device and producing light data;
- a processor for calculating a position of the emitter device based on the light data from the light sensor;
- a movement data generator means for randomly selecting a predetermined race development data from a plurality of predetermined race development data and generating the movement data for the movable object in accordance with the position calculated by the processor and said randomly selected predetermined race development data; and a movement data sender for sending the generated movement data to the drive controller.

2. A racing game system according to claim 1, wherein the emitter device is a light emitting element.

3. A racing game system according to claim 1, wherein:

the light sensor includes a lens for focusing a light image on a surface of the light sensor; and the processor includes a corrector for correcting the calculated position of the emitter device by a possible distortion of the light image by the lens.

4. A racing game system according to claim 1, wherein:

the emitter device is operable to emit light in a frequency band outside a frequency band of visible light; and the light sensor is operable to receive only light in the frequency band of the light emitted by the emitter device.

5. A racing game system according to claim 1, wherein the predetermined race development data consists of a goal position data and a speed data.

6. A racing game system according to claim 1, wherein the predetermined race development data is selected from a plurality of kinds of race development data.

7. A racing game system according to claim 1, further comprising an emitter controller for controlling the emitter device to emit light at a specified time.

8. A racing game system according to claim 7, wherein:

the emitter controller directs the emitter device to emit light when the movable object is at a predetermined position for the movable object; and the processor further identifies the movable object based on the light emission at the predetermined position.

9. A racing game system according to claim 7 wherein:

the emitter device includes a first emitter and a second emitter and the emitter controller has means for controlling the first and second emitters to emit light at different times when the movable object is at a predetermined position for the movable object; and the processor has means for detecting a running direction of the movable object based on the light data produced by said light sensor in response to the respective light emissions of the first and second emitters at the predetermined position.

10. A racing game system according to claim 1, wherein the processor includes:

a memory for storing the light data from the light sensor in a storage area of the memory;

a designator for designating a portion of the storage area of the memory;

a reader for reading the light data within the designated portion of the storage area; and a calculator for calculating a position of the movable object based on the read light data.

11. A racing game system according to claim 10, wherein:

the light sensor includes an area sensor provided with photoelectric conversion elements arranged in a matrix; and the calculator includes:

a counting portion for counting a number of photoelectric conversion elements which have received light from the emitter device based on the light data read by the reader;

a coordinate value accumulating portion for accumulating coordinate values of the photoelectric conversion elements counted by the counter in the memory; and a calculating portion for calculating a position of the emitter device based on the counted number and the accumulated coordinate values.

12. A racing game system according to claim 10, wherein the designator designates a next portion based on a currently calculated position of the emitter device.

13. A racing game system according to claim 10, wherein the designator includes:

a moved amount calculating portion for calculating a moved amount of the emitter device based on the calculated position of the emitter device; and a designating portion for designating a next portion based on a currently calculated position of the emitter device and the calculated moved amount.

14. A system for remotely controlling a movable object comprising:

a drive controller, disposed on the movable object, for controlling driving of the movable object in accordance with movement data;

an emitter device for emitting light disposed on the movable object;

a light sensor for receiving light emitted from the emitter device and producing light data;

a processor for calculating a position of the emitter device based on the light data from the light sensor;

a movement data generator for generating the movement data for the movable object in accordance with the position calculated by the processor;

a movement data sender for sending the movement data to the drive controller disposed on the movable object;

an emitter controller for controlling the emitter device to emit light at a specified time;

the emitter device including a first emitter and a second emitter attached to the movable object and the emitter controller having means for controlling the first and second emitters to emit light at different times when the movable object is at a predetermined position for the movable object; and the processor having means for detecting a running direction of the movable object based on the light data produced by said light sensor in response to the respective light emissions of the first and second emitters at the predetermined position.

15. A system for remotely controlling a movable object comprising:

a drive controller, disposed on the movable object, for controlling driving of the movable object in accordance with movement data;

an emitter device for emitting light disposed on the movable object;

a light sensor for receiving light emitted from the emitter device to produce light data;

a processor for calculating a position of the emitter device based on the light data from the light sensor;

a movement data generator for generating the movement data for the movable object in accordance with the position calculated by the processor:

a movement data sender for sending the movement data to the drive controller disposed on the movable object;

the processor including:

a memory for storing the light data from the light sensor in a storage area of the memory;

a designator for designating a portion of the storage area of the memory;

a reader for reading the light data within the designated portion of the storage area; and a calculator for calculating a position of the movable object based on the read light data.

16. A system according to claim 15, wherein:

the light sensor includes an area sensor having photoelectric conversion elements arranged in a matrix; and the calculator includes:

a counting portion for counting a number of photoelectric conversion elements which have received light from the emitter device based on the light data read by the reader;

a coordinate value accumulating portion for accumulating coordinate values of the photoelectric conversion elements counted by the counter in the memory; and a calculating portion for calculating a position of the emitter device based on the counted number and the accumulated coordinate values.

17. A system according to claim 15, wherein the designator designates a next portion based on a currently calculated position of the emitter device.

18. A system according to claim 15, wherein the designator includes:

a moved amount calculating portion for calculating a moved amount of the emitter device based on the calculated position of the emitter device; and a designating portion for designating a next portion based on a currently calculated position of the emitter device and the calculated moved amount.

19. A racing game apparatus comprising:

movable objects each having;

a drive controller for controlling movement of the respective movable object in accordance with movement data; and an emitter device for emitting light;

a platform having racing area on which the movable objects are moved;

a light sensor device for receiving light emitted from said emitter devices to produce light data;

a processor for calculating positions of the movable objects based on the light data from the light sensor;

a movement data generator means for randomly selecting a predetermined race development data from a plurality of predetermined race development data and generating the movement data for each of the movable objects in accordance with the positions calculated by the processor and said randomly selected predetermined race development data; and a movement data sender for sending the generated movement data to each one of the drive controllers provided on the respective movable objects.

20. A system for remotely controlling a movable object comprising:

a drive controller, disposed on the movable object, for controlling driving of the movable object in accordance with movement data;

an emitter device for emitting light disposed on the movable object;

a light sensor for receiving light emitted from the emitter device and producing light data;

a processor for calculating a position of the emitter device based on the light data from the light sensor;

a movement data generator for generating the movement data for the movable object in accordance with the position calculated by the processor;

a movement data sender for sending the movement data to the drive controller;

an emitter controller for controlling the emitter device attached to the movable object to emit light at a specified time; and the emitter device including a first emitter and a second emitter and the emitter controller having means for controlling the first and second emitters to emit light.

* * * * *